(12) United States Patent
Sutton et al.

(10) Patent No.: US 8,820,355 B2
(45) Date of Patent: *Sep. 2, 2014

(54) METHOD AND APPARATUS FOR CLEANING POOLS WITH REDUCED ENERGY CONSUMPTION

(75) Inventors: S. Jepson Sutton, Phoenix, AZ (US); Sam Sutton, Sedona, AZ (US)

(73) Assignee: Aspen Research, Ltd, Phoenix, AZ (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/507,505

(22) Filed: Jul. 5, 2012

(65) Prior Publication Data

US 2013/0007954 A1    Jan. 10, 2013

Related U.S. Application Data

(63) Continuation-in-part of application No. 12/657,882, filed on Jan. 29, 2010, now Pat. No. 8,256,461.

(60) Provisional application No. 61/148,459, filed on Jan. 30, 2009.

(51) Int. Cl.
| | | |
|---|---|---|
| *F16K 11/074* | (2006.01) | |
| *F16K 31/524* | (2006.01) | |
| *E04H 4/12* | (2006.01) | |
| *E04H 4/16* | (2006.01) | |

(52) U.S. Cl.
CPC ........ *E04H 4/1272* (2013.01); *F16K 31/52483* (2013.01); *E04H 4/169* (2013.01)
USPC ................. 137/625.11; 137/119.07; 251/251; 4/490; 4/509

(58) Field of Classification Search
USPC ............ 137/625.11, 625.12, 625.13, 119.07; 251/251, 252, 254, 255, 205, 208, 262, 251/263; 4/490, 509
See application file for complete search history.

(56) References Cited

U.S. PATENT DOCUMENTS

| | | | | | |
|---|---|---|---|---|---|
| 3,261,371 | A | * | 7/1966 | Vernon | 134/168 R |
| 3,913,455 | A | * | 10/1975 | Green et al. | 91/492 |
| 4,313,455 | A | * | 2/1982 | Pitman | 137/119.07 |
| 4,523,606 | A | * | 6/1985 | Gould et al. | 137/119.07 |
| 4,570,663 | A | * | 2/1986 | Gould et al. | 137/119.07 |
| 4,592,379 | A | * | 6/1986 | Goettl | 137/119.07 |
| 4,592,737 | A | * | 6/1986 | Dhont | 474/19 |
| 4,995,123 | A | * | 2/1991 | Kern | 4/490 |
| 5,785,846 | A | * | 7/1998 | Barnes et al. | 210/167.12 |
| 6,022,481 | A | * | 2/2000 | Blake | 210/776 |
| 6,325,087 | B1 | * | 12/2001 | Tarr | 137/1 |
| 6,345,645 | B1 | * | 2/2002 | Kenna et al. | 137/625.11 |
| 6,379,274 | B1 | * | 4/2002 | Robert | 474/19 |
| 6,386,232 | B2 | * | 5/2002 | Serrano Sanchez et al. | 137/624.14 |
| 6,419,840 | B1 | * | 7/2002 | Meincke | 210/767 |

(Continued)

*Primary Examiner* — Eric Keasel
*Assistant Examiner* — Minh Le

(57) ABSTRACT

Methods and apparatus are disclosed for substantially improving the energy efficiency of swimming pools having in-floor cleaning systems. Comprehensive data is provided demonstrating the improvement in cleaning capacity realized in a typical prior art pool before and after conversion to the present invention. Methods are disclosed for the reallocation of all or a substantial part of the increase in cleaning capacity toward a proportionate reduction in energy consumption by reducing the run time or operating speed of the pool pump motor while maintaining the same or a higher level of cleaning capacity achieved by the prior art.

19 Claims, 14 Drawing Sheets

(56) References Cited

U.S. PATENT DOCUMENTS

| | | | |
|---|---|---|---|
| 6,592,752 B2 * | 7/2003 | Mathews | 210/97 |
| 7,571,496 B2 * | 8/2009 | Martin | 4/490 |
| 7,862,712 B2 * | 1/2011 | Tak | 210/167.13 |
| 8,308,081 B1 * | 11/2012 | Goettl | 239/205 |
| 8,533,874 B1 * | 9/2013 | Goettl | 4/490 |
| 2003/0056284 A1 * | 3/2003 | Mathews | 4/490 |
| 2004/0210998 A1 * | 10/2004 | Mathews | 4/490 |
| 2009/0000021 A1 * | 1/2009 | Martin | 4/490 |
| 2009/0211641 A1 * | 8/2009 | Tipotsch | 137/1 |
| 2012/0227175 A1 * | 9/2012 | Ford | 4/490 |

\* cited by examiner

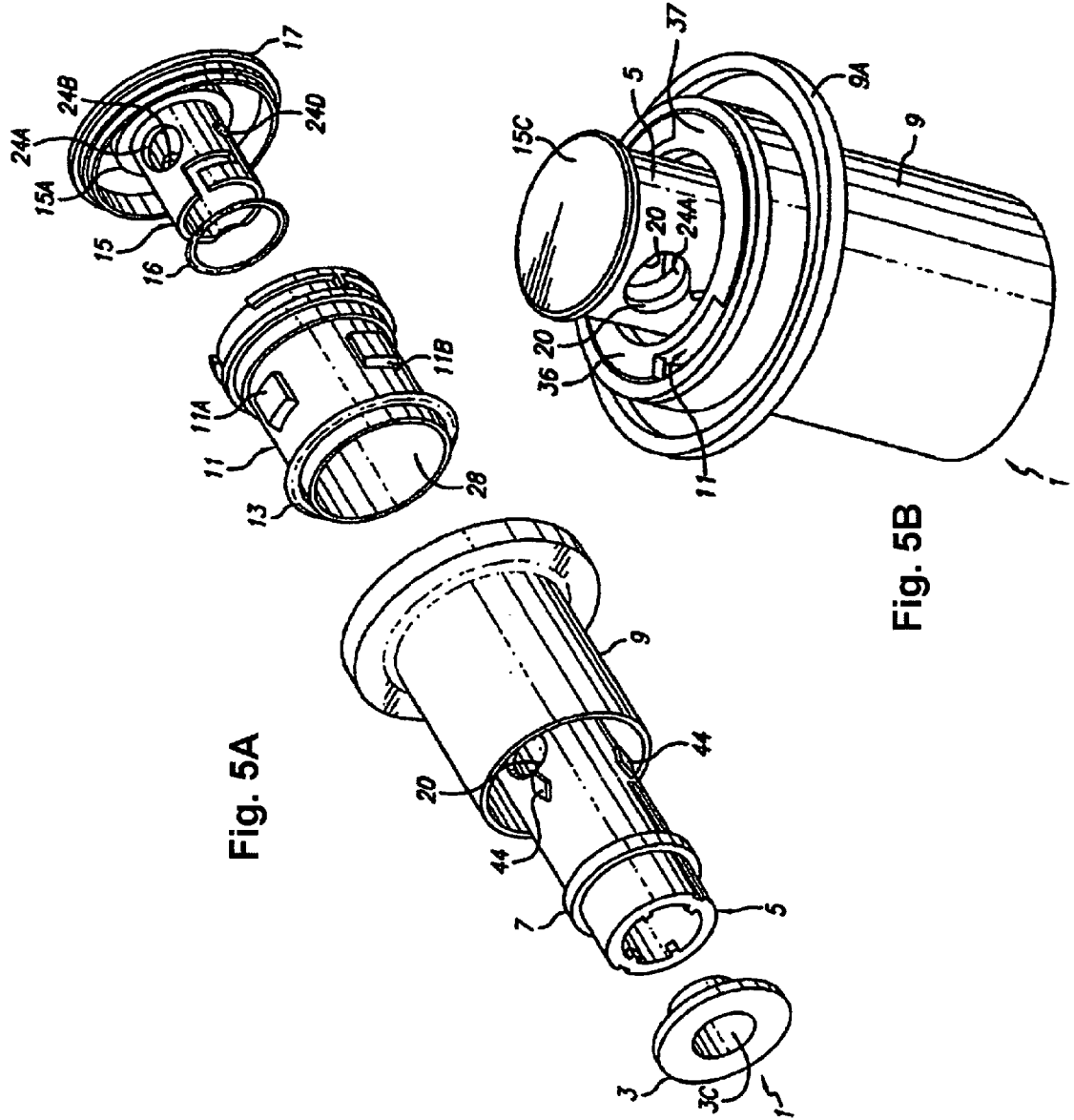

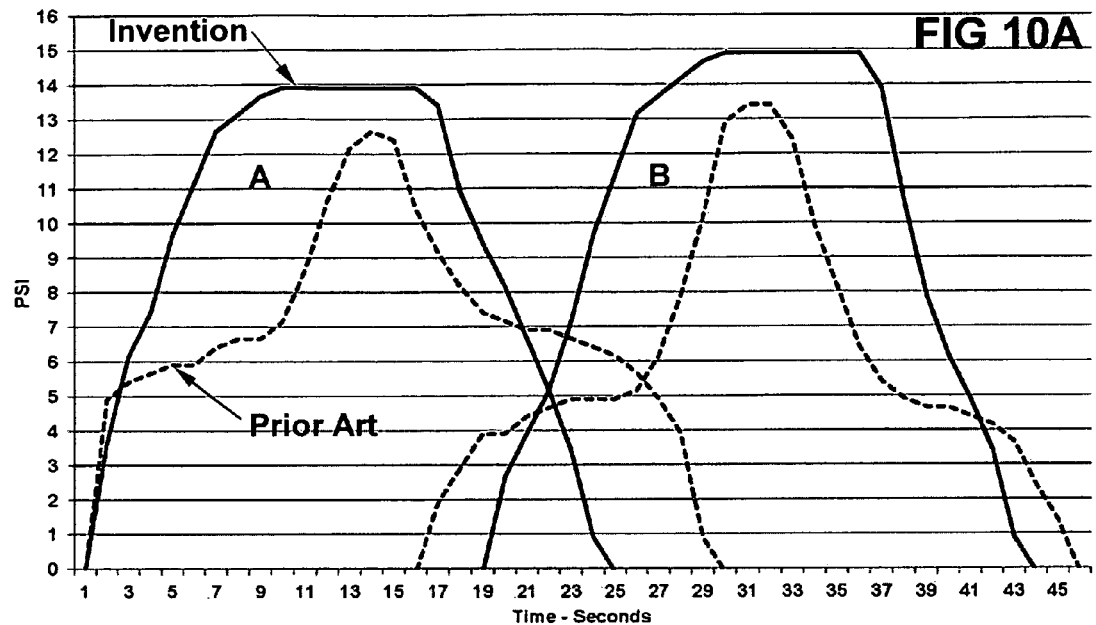
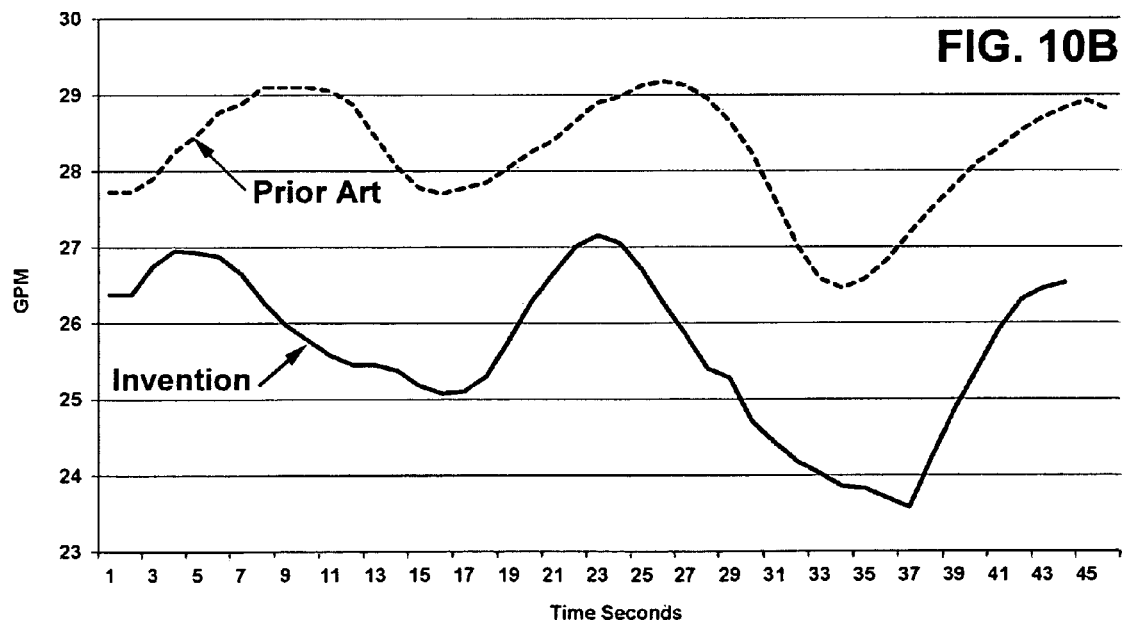

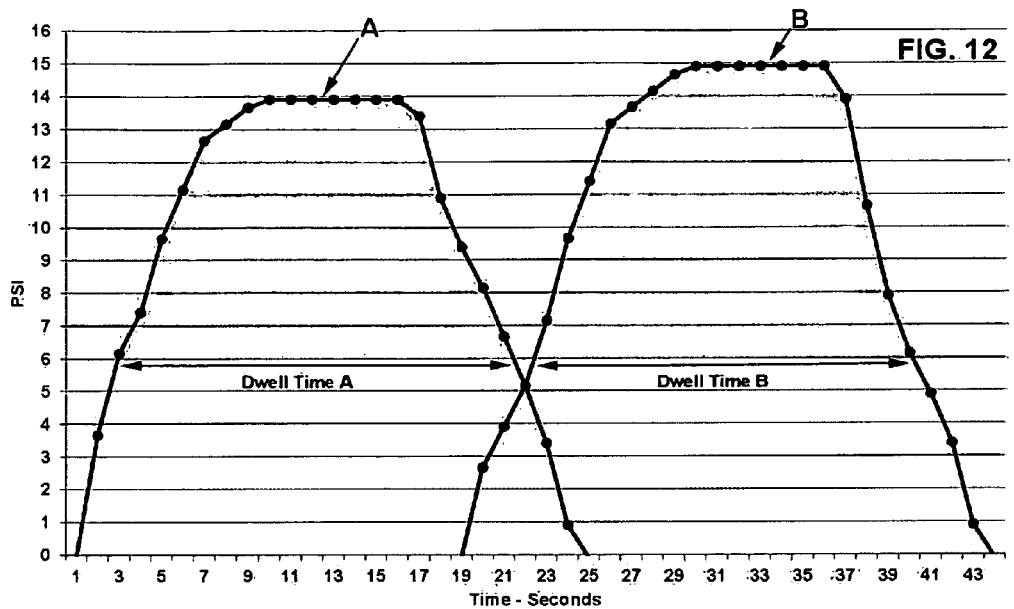

METHOD AND APPARATUS FOR CLEANING POOLS WITH REDUCED ENERGY CONSUMPTION

RELATED APPLICATION

This application is a continuation-in-part of and claims priority to the complete application entitled "Improved Distribution Valve and Cam Mechanism" that was filed Jan. 29, 2010 and assigned Ser. No. 12/657,882 (now U.S. Pat. No. 8,256,461, issued Sep. 4, 2012), which application claimed priority to the earlier provisional application filed Jan. 30, 2009, Ser. No. 61/148,459. The disclosures contained in these two related applications are incorporated herein by reference.

BACKGROUND

A. Field of Invention

The invention of the present application relates to swimming pools having in-floor cleaning systems and, more particularly, to improved methods and apparatus for operating such pools with significantly less energy consumption and/or the use of fewer in-floor cleaning heads and related plumbing. The methods and apparatus of the present invention have utility in retrofitting existing swimming pools for greater energy efficiency and in the construction of new swimming pools that are more energy efficient and/or less costly to construct. The methods and combined structures of the present invention can be used to substantially increase the energy efficiency of a wide range of differently configured swimming pools that incorporate in-floor cleaning systems from several different manufacturers and various combinations of commercially available components.

B. Prior Art Systems, Components and Patents

1. Filtration and Skimming Systems—FIG. 1 shows the basic elements of a prior art swimming pool including: a concrete, vinyl or fiberglass pool 1 having an optional steps 2 and seating area 3 at one end; a main drain 4 and skimmer 5 through which water is drawn from the pool 1 through a strainer 6 by a pump 7 that circulates pressurized water through a filter 8 and through various fittings back into the pool 1. The pump 7 is driven by an electric motor 9 which is selectively activated by a 24-hour timer 10 that sets the length of time and the time of day that the motor 9 is connected to a source of electric power 11. A three-way valve 12 has two inlet ports that are in separate fluid communication with the skimmer 5 and the main drain 4. The valve 12 is used to selectively balance the flow of water drawn from the skimmer 5 and the main drain 4, through the strainer 6 and into the suction side of a pump 7. The individual components of prior art swimming pools such as the one shown in FIG. 1 can assume many different forms; for example: the filter 8 may be a sand, diatomaceous earth or paper cartridge filter; the skimmer 5 may be a suction type as indicated in FIG. 1 or a pressure/venturi type shown in FIGS. 2 and 6B. Likewise, the drain 4 may take the form of a single drain or a plurality of separate drains.

2. In-Floor Cleaning Systems—FIG. 1 also shows the additional elements used in prior art swimming pools having in-floor cleaning systems. Included are a multiport distribution valve 16, which in this example has six output ports numbered as such. The multi-port distribution valve 16 receives pressurized flow from the output of the pump 7 (after it passes through the filter 8) and directs this flow sequentially through the separate outlet ports identified in FIG. 1 as ports 1 through 6 on valve 16. Each of the outlet ports (1 through 6) on valve 16 is in separate fluid communication with one of the sets of individual popup cleaning heads 17. As shown by the broken lines connecting individual popup heads 17 in FIG. 1, these popup heads 17 are commonly plumbed in six sets. Each of these sets is in separate fluid communication with one of the six outlet ports on valve 16, as indicated by the broken flow arrows labeled Port 1 through Port 6. The individual popup heads 17 are flush mounted in the surfaces of the pool 1 and distributed over the surfaces of the pool to allow even cleaning.

3. Commercial Systems and Patents—The structure and operation of in-floor cleaning systems, including the rotating valves and popup heads they incorporate are well known and have been the focus of extensive research, development, commercial and patent activity over the past three decades. Examples of prior art rotating valves include: (a) the early rotating valve manufactured by Pinnacle Engineering and described in U.S. Pat. No. 3,779,269; (b) the rotating valves manufactured by Shasta Industries, Inc. and exemplified by U.S. Pat. Nos. 4,523,606, 4,570,663, 4,817,656, 6,189,556, 6,325,087, and 6,539,967; (c) the rotating valves manufactured by Paramount Leisure Industries, Inc and exemplified by U.S. Pat. Nos. 4,592,379, 6,311,728, 6,314,999 and 6,360, 767; (d) the stepping motor valve manufactured by Polaris Pool Systems/Caretaker Systems Inc. as shown in U.S. Pat. No. 6,345,645; (e) the "Net'N'Clean" rotating valve sold by Astrol; and (f) the "Q360" rotating valve sold by Blue Squared Manufacturing. In general, all of these distribution valves can be either retrofitted to incorporate the cam of the present invention or replaced with a distribution valve that functions in accord with the present invention. Examples of prior art cleaning heads include: (a) the early cleaning heads marketed under the "Turbo Clean" brand as described in U.S. Pat. Nos. 3,408,006 and 4,300,246; (b) the popup heads manufactured by Shasta Industries, Inc. and exemplified by U.S. Pat. Nos. 4,322,860, 4,523,606, and 6,971,588; (c) the popup heads manufactured by Paramount Leisure Industries, Inc and exemplified by U.S. Pat. Nos. 3,521,304, 5,251,343, 6,301,723, 6,367,098, 6,393,629, 6,601,244, 6,848,124, and 7,578,010; (c) the popup heads manufactured by Polaris Pool Systems/Caretaker Systems Inc and exemplified by U.S. Pat. Nos. 4,271,541 and 4,371,994; (d) the "Net'N'Clean" head sold by Astrol; and (e) the "Q360" head sold by Blue Squared Manufacturing. In general, systems that incorporate these popup heads can be retrofitted to incorporate the methods and apparatus of the present invention. These and many other components and parts for in-floor cleaning systems are commercially distributed through Infloor Parts.Com (http://www.infloorpool parts.com/). The disclosures contained in the prior U.S. patents identified in this paragraph are incorporated herein by reference.

Factors Affecting Energy Consumption

1. Energy Consumption—In the context of single family homes, the most energy-intensive functions are those related to space heating and cooling. Where present, swimming pools consume the second largest amount electrical energy in homes. The amount of energy required for operation of a swimming pool is dictated primarily by the size and capacity of the pump motor plus the speed and length of time that the pump motor must operate for effective filtration and cleaning. The capacity of pump motors on any particular pool is dictated by many factors, including the volume of the pool, the distance from the pump to the pool and the flow demand of associated water distribution and utilization components, such as: pipes and connectors; skimmers and other debris removal elements; spas; and aesthetic features including water jets, fountains and waterfalls.

2. Energy Trends—The past thirty years have seen a substantial increase in the average size of swimming pools and a further increase in flow demand due to the incorporation of more water-driven features. These increases have required the use of higher capacity pumps and motors for effective operation. Pool pump motors in the 1970's were typically rated in the range between three-quarters and one horse power. Present day swimming pools typically have pumps capable of producing between one-and-a-half and three horse power. This increased demand for pumping capacity has come at the cost of proportionately increased energy consumption. Higher pumping capacity has also required larger diameter and more expensive plumbing components to accommodate the higher flow rates, thus increasing the initial cost of constructing swimming pools. In the 1970's swimming pools incorporated plumbing components characterized by an inside diameter of 1.5 inches; today flow capacity has been increased by over 175% (1.00/0.56×100%) requiring plumbing components based on a minimum of a 2 inch inside diameter and return/suction lines having inside diameters of 2.5 inches or greater.

3. Conservation Incentives—For many years, there have been state, federal and utility-sponsored programs that provide tax deductions, tax credits, utility rebates and other incentives to encourage home owners to install or replace existing electrical appliances with newer units having greater energy efficiency. Efforts to operate swimming pools using less energy have focused almost exclusively on the use of pump motors that are more efficient or capable of operating at variable speeds and the use of timers to limit the number of hours the pool pump operates each day.

4. Pump Run Time—Over the past decade, standard pump motors have been increasingly replaced by motors that cost more but produce the same output with approximately 20% greater efficiency. Inexpensive timers have been widely used to limit the pool motor operation to between 8 and 12 hours per day, depending on the volume of the pool and the rate at which the pump circulates pool water through the filter. Some pools also use timers to limit the pool motor operation to "off-peak" hours (typically between 9 p.m. and 6 a.m.) to take advantage of lower electrical rates charged by most utilities during times when system-wide usage is a fraction of the utility's peak generation capacity. These "time of day" controllers reduce the cost of electrical energy but they do not reduce the actual amount of energy required for proper operation of the swimming pool cleaning system. More recently, multiple speed and variable speed motors are replacing single-speed pump motors that operate at a fixed speed of 3450 revolutions per minute (rpm). Variable speed motors allow the pump to be operated at a high rpm when flow requirements are high and at a significantly lower rpm when a lower flow rate is sufficient for long-term functions such as water circulation and filtration. A properly designed variable speed motor will consume less electrical energy at lower speeds than at higher speeds; and, in many cases, the energy savings is disproportionately greater than the reduction in motor speed. For any particular swimming pool, a reduction in the pump run time will produce the greatest amount of energy savings, so long as the reduction in run time does not adversely impact the cleaning, filtration or disinfection functions required for safe and enjoyable long-term use of the pool.

5. Basic Turnover Time—For proper water filtration and treatment of any given swimming pool, it is generally required that a minimum volume of water be circulated through the filter during each 24-hour period. This minimum volume of circulated water in the case of residential pools is generally recognized as being equal to the volume of water in the pool itself. The time required to circulate this volume of water is referred to as the "turnover" time for the particular pool. For an average sized residential pool having a volume of approximately 20,000 gallons, the turnover time would be the time required for the pump to circulate 20,000 gallons through the filter. With a properly sized pump and motor, this turnover time has typically required operation of the pump for between 8 and 10 hours each day to assure adequate filtration and treatment of the water. The total amount of time required for adequate filtration can increase or decrease for any particular pool depending on how heavily it is used, the time of year and weather conditions that affect the cleaning load on the pool.

6. In-Floor Turnover Time—Swimming pools having in-floor cleaning systems have been increasingly adopted since they were introduced some thirty years ago. While adding to the initial cost of a pool, these systems have been justified by a significant reduction in the amount of time and labor required for regular pool cleaning. In addition, these cleaning systems do not detract from the critical aesthetics of a pool, since they eliminate unsightly mechanical whips or crawling devices. In-floor cleaning systems operate in response to a pressurized flow of water delivered to pop-up cleaning heads at a minimum operating pressure, which typically ranges between about 5 and 10 pounds per square inch, depending upon a number of design factors. The flow of water through these cleaning heads not only aids in the suspension of particles and transport of debris from the pool surfaces, this same flow counts toward the required daily "turnover" of the pool water for filtration purposes. In addition to their cleaning function and contribution toward daily turnover, popup heads serve to return filtered, treated and uniform temperature water to the pool at widely distributed points.

7. Cleaning Cycle—Pools having in-floor cleaning systems must be operated each day for a period of time that is a function of both the "turnover time" and the "cleaning time." The cleaning time is, in turn, a function of the number of "cleaning cycles" required for the jet emitted from each popup head to properly transport dust and debris from within cleaning radius of that head. In-floor cleaning heads rotate on an incremental (or in some cases random) basis each time they are activated by the flow of pressurized water. For example, a popup head that rotates in increments of about 30 degrees each time it is activated will complete one "cleaning cycle" when it has been activated 12 times resulting in its jet being directed to the surrounding 360 degrees of surface area within its cleaning radius.

8. Cleaning Time—Depending on the flow rate through the rotating, multi-port distribution valve (16 in FIG. 1), the valve will complete one full rotation every few minutes. During one full rotation of the distribution valve, each of the six ports will direct the pressurized flow of water to one set of popup heads and each of the individual popup heads will be activated, will direct a jet of water along the adjacent surface of the pool and will then advance to the next incremental position. For example, in reference to FIG. 1, if the flow from the pump 7 to rotating distribution 16 is at a rate that drives the valve to complete one revolution in about six minutes, then each set of popup heads 17 will be activated and rotate incrementally once every six minutes. If a popup cleaning head increments 12 times for each 360 degree cleaning cycle, then each such cleaning cycle will take about 72 minutes. (6 minutes per valve revolution multiplied by 12 increments per head rotation equals 72 minutes per cleaning cycle). The "cleaning time" for a swimming pool having this configuration would depend on the number of cleaning cycles that must be completed for adequate movement of debris and particles from the surface of the pool toward and into the drain for transport to the filter. Total cleaning time for this type of system could range from four to eight cleaning cycles, depending on the configuration of the pool, location of the popup heads, volume of flow and the operating pressure delivered to the popup heads. Cleaning time can also be influenced by exterior conditions that cannot be planned for such as wind storms and particularly heavy use of the pool.

9. Dwell Time—The concept of "dwell time" as a measure of cleaning effectiveness and efficiency was introduced, explained and empirically documented in the application entitled "Improved Distribution Valve and Cam Mechanism" filed Jan. 29, 2010 and assigned Ser. No. 12/657,882, now U.S. Pat. No. 8,256,451, of which the present application is a continuation-in-part. "Dwell time" is the period during which a popup head is activated and receives a flow of water at or above a peak operating pressure. As described in the parent application (see FIGS. 9 through 13), the effective cleaning area associated with popup heads is significantly enhanced by configuring the cam used in rotating distribution valves: (a) to reduce or generally minimize the duration of concurrent flow through adjacent outlets of the distribution valve and (b) to increase or generally maximize the duration of flow to said popup heads at a pressure that equals or exceeds a predetermined minimum operating pressure associated with said popup heads (see FIGS. 9 through 13). This simple innovation in the design of distribution valves has been shown to substantially increase the functional dwell time without any modification to the popup heads, while increasing the effective cleaning area of the popup heads by a factor of between 30% and 75% compared to identical heads operated under identical conditions using the same distribution valve incorporating a prior art cam (see FIGS. 14 through 16 in the parent application).

10. Dwell Factor—An operating combination of popup heads together with a particular distribution valve can also be characterized in terms of a "dwell factor," which measures not just the time that head pressure is above a peak value but accounts for the summation or integral of head pressures above a predetermined operating pressure over the entire dwell time. It is thought that the dwell factor is a more complete indicator of the relative cleaning efficiency of an in-floor system. As compared to an otherwise identical system using a prior art distribution valve, the same system using the present invention will produce a dwell factor that is between 60% and over 200% greater than the dwell factor associated with the prior art system.

OBJECTS OF THE INVENTION

One objective of the present invention is to provide methods and apparatus that increase the cleaning efficiency of swimming pools having in-floor cleaning systems that operate in conjunction with a multi-port distribution valve. Another primary objective is to provide methods and apparatus for allocating all or part of the increase in cleaning efficiency toward the reduction of energy use while maintaining an acceptable level of filtration and in-floor cleaning performance.

SUMMARY OF THE INVENTION

The most effective summary of the present invention can be stated in terms of the novel combinations of method steps which the invention incorporates into the operation of a swimming pool having a prior art circulation, filtration and in-floor cleaning system. In general, the invention consists of methods and separately claimed combinations of structural elements that significantly enhance the cleaning efficiency of such pools and allow for the allocation of this increased efficiency toward the reduction of energy costs by reducing the length of time and/or speed at which the pool pump motor is operated.

Against this background, the invention may be summarized as a method for improving the energy efficiency of swimming pool cleaning systems that include (i) a water circulation pump driven by an electric motor, said pump having a pressurized outlet in fluid communication with a filter and a suction return inlet in fluid communication with at least one drain in said pool; (ii) a multiport water distribution valve controlled by a rotating cam, said distribution valve having an inlet in fluid communication via said filter with the outlet of the pump and having a plurality of sequentially actuated outlets for distributing flow from the inlet; (iii) plural sets of popup cleaning heads each of said heads having an inlet in fluid communication with one of the outlets from said water distribution valve and further having a jet-forming aperture in fluid communication with an outlet from the head, said heads being mounted in the pool surface and, in response to a flow of water, extending from said surface and directing a jet of water along the adjacent surface of the pool for the purpose of moving debris toward said drain and suspending particles for incorporation into the return flow to said circulation pump and said filter, the method including the steps of:
  (a) configuring said cam to generally minimizing the concurrent flow through adjacent outlets of said multi-port distribution valve;
  (b) configuring said cam to generally maximizing the duration and magnitude of pressure delivered to said popup heads when said pressure is above a pre-determined minimum pressure associated with said popup heads; and,
  (c) controlling the operation of said motor to generally minimizing the total time, over any 24-hour period, when the pressure delivered to said popup heads exceeds said pre-determined minimum pressure while maintaining adequate movement of debris and suspension of particles from the surface of said pool.

Additional energy-saving features of the present invention are realized when the improved distribution valve is used in further combination with other elements often incorporated into new and existing swimming pools. For example, improved cleaning, filtration and/or increased energy efficiency is achieved when the steps of the basic method summarized above are augmented with additional steps including:
  (d) supplementing the flow of water to said popup heads by incorporating at least one venturi between the outlet of said filter and the outlets of said popup heads and placing the suction port of said venturi in fluid communication with the water in said swimming pool;
  (e) controlling said pool pump motor to operate at a first reduced speed to deliver a flow of water to said heads at a pressure that exceeds said predetermined minimum pressure by an amount required for normal operation of said popup heads;
  (f) controlling said pool pump motor to operate at a second substantially reduced speed to deliver a flow of water to said heads at a pressure below said predetermined minimum pressure and at a pressure above that level required for circulation of water through said filter;
  (g) providing said pool with at least one venturi-driven skimmer in controlled fluid communication with the outlet of said pump;

(h) allocating the flow of water from the outlet of said pump between said distribution valve and said venturi-driven skimmer when the pump is running at or above said first reduced speed and directing said flow of water to the venturi-driven skimmer when the pump is running at said second substantially reduced speed;

(i) activating at least one ozone generator to inject ozone into the circulating flow of water during substantial portions of the time that the circulation pump motor is in operation.

DESCRIPTION OF THE DRAWINGS

FIGS. 3A and 3B correspond to FIGS. 1A and 1B in the parent to the present application FIGS. 4A and 4B correspond to FIGS. 12 and 13 in the parent to the present application.

FIGS. 5A and 5B show the basic functional elements of one form of popup head that can be used to form the new combinations of the present invention and/or to execute the new methods thereof. FIGS. 5A and 5B correspond to FIGS. 1 and 2B from U.S. Pat. No. 6,971,588.

FIG. 6A shows a standard skimmer. FIG. 6B shows a prior art venturi skimmer suitable for use in new swimming pool construction.

FIG. 6C shows a new form of retrofit skimmer suitable for incorporation into both new and existing pools.

FIGS. 10A and 10B are plots of data sets recorded when the pool shown in FIG. 8 was operated at a motor speed of 3450 rpm with and without the present invention.

FIG. 12 is a reproduction of the plot shown in FIG. 9 which has been shaded to show the area corresponding to the dwell factor for a minimum operating pressure of 6 psi.

FIG. 13 is a table showing the dwell factor values associated with the pool shown in FIG. 8 when operate at 3000 and 3450 rpm.

FIG. 14 is a table the peak pressure, average flow and power associate with the pool of FIG. 8 when alternatively configured as the prior art or the present invention and operated at 3000 and 3450 rpm.

DETAILED DESCRIPTION

A. System Elements

1. Circulation, Filtration and Control

Figure 2:
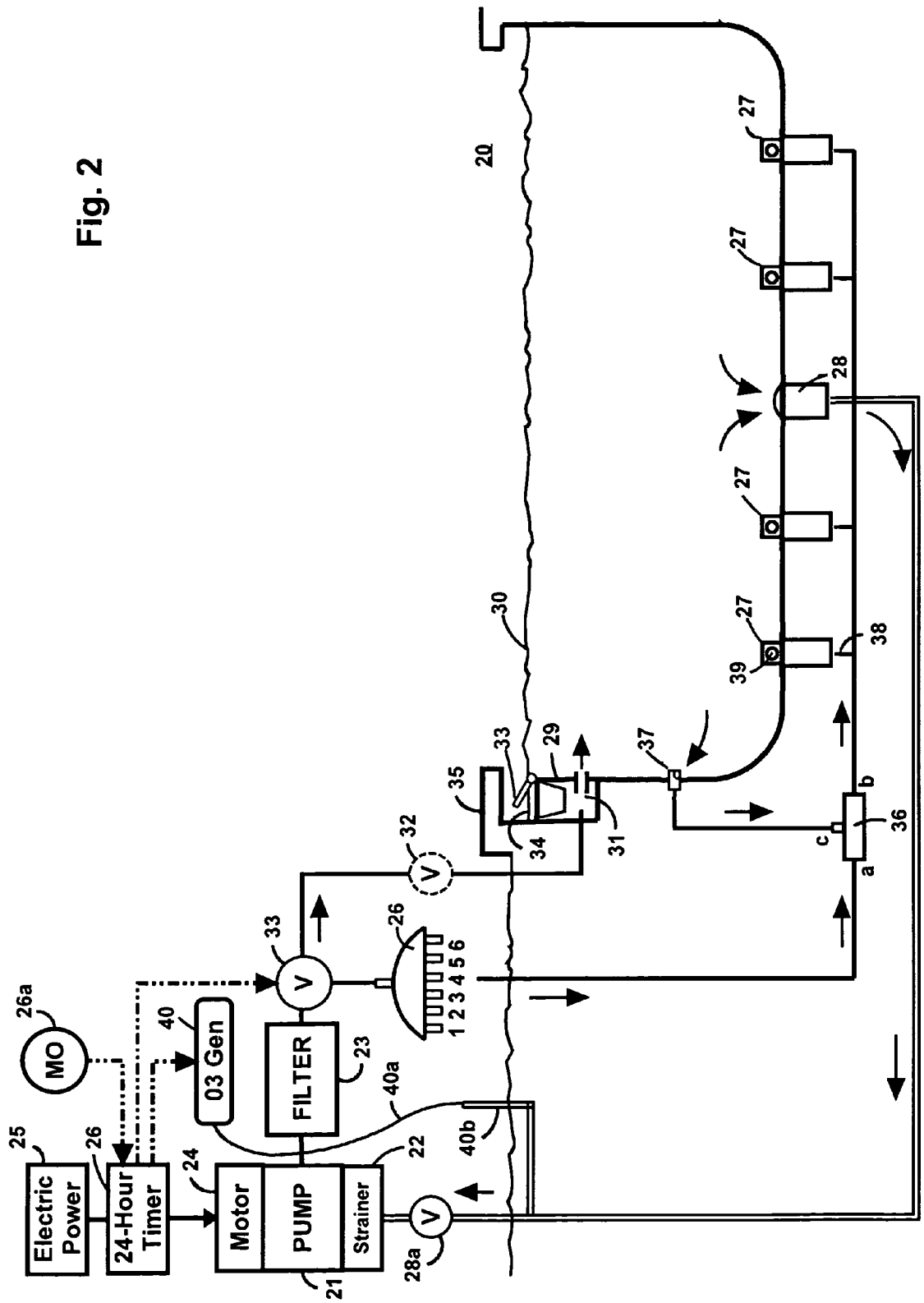
FIG. 2 shows the basic and optional elements combined to form the system of the present invention and to carry out the methods underlying that system.

FIG. 2 illustrates the functional elements that can be variously combined to form different combinations that embody the present invention and to carry out the methods that underlie those different combinations. The swimming pool 20, shown in a partial sectional view, includes a circulation and filtration system driven by a pump 21 having a strainer 22 on its suction or intake side and a filter 23 in fluid communication with its pressure or outlet side.

The pump 21 is powered by an electric motor 24 which is connected to a source of electricity 25 through a 24-hour timer 26. In different embodiments of the invention, the pump motor 24 is a standard, single-speed pool pump motor that operates at 3450 revolutions per minute (rpm) or the motor 24 can be a dual speed, multi-speed or variable speed pool pump motor, as will be further described in below.

The timer 26 can be one of many different products readily available in the pool and spa market, ranging from a simple electro-mechanical device to a sophisticated, multi-function digital controller. In a preferred form, timer 26 can be set to selectively activate the electric motor 24 during one or more predetermined run times that are initiated at predetermined start times during successive 24-hour timing cycles. The timer 23 can be set to allow operation of the circulation, filtration and cleaning system for a period best suited to the "turn over time," "cleaning time" and "dwell time" of the particular swimming pool 20. The timer 26 can also be used to limit operation of the pump motor 24 to periods when utility rates are at or near their lowest levels.

As shown in FIG. 2, systems embodying the present invention may include a manual override 26A that will allow the user to selectively activate the pump motor 24 when (a) weather or heavy use dictates the need for supplemental cleaning or filtration, or (b) periodic service or maintenance requires operation of the system.

2. Improved Distribution Valve

FIG. 2 illustrates the basic functional elements of an in-floor cleaning system that operates in conjunction with the cleaning and filtration elements. Central to the energy efficient cleaning system of the present invention is the improved cam-operated distribution valve 26 which is illustrated and described in application Ser. No. 12/657,882, filed Jan. 29, 2010 and entitled "Improved Distribution Valve and Cam Mechanism" (now U.S. Pat. No. 8,256,461) and incorporated herein by reference. The distribution valve 26 has a single inlet port in fluid communication with the outlet from the filter 23 and a plurality of outlet ports (six in this embodiment) each of which is in fluid communication with a separate set of individual popup heads 27.

Figure 1:
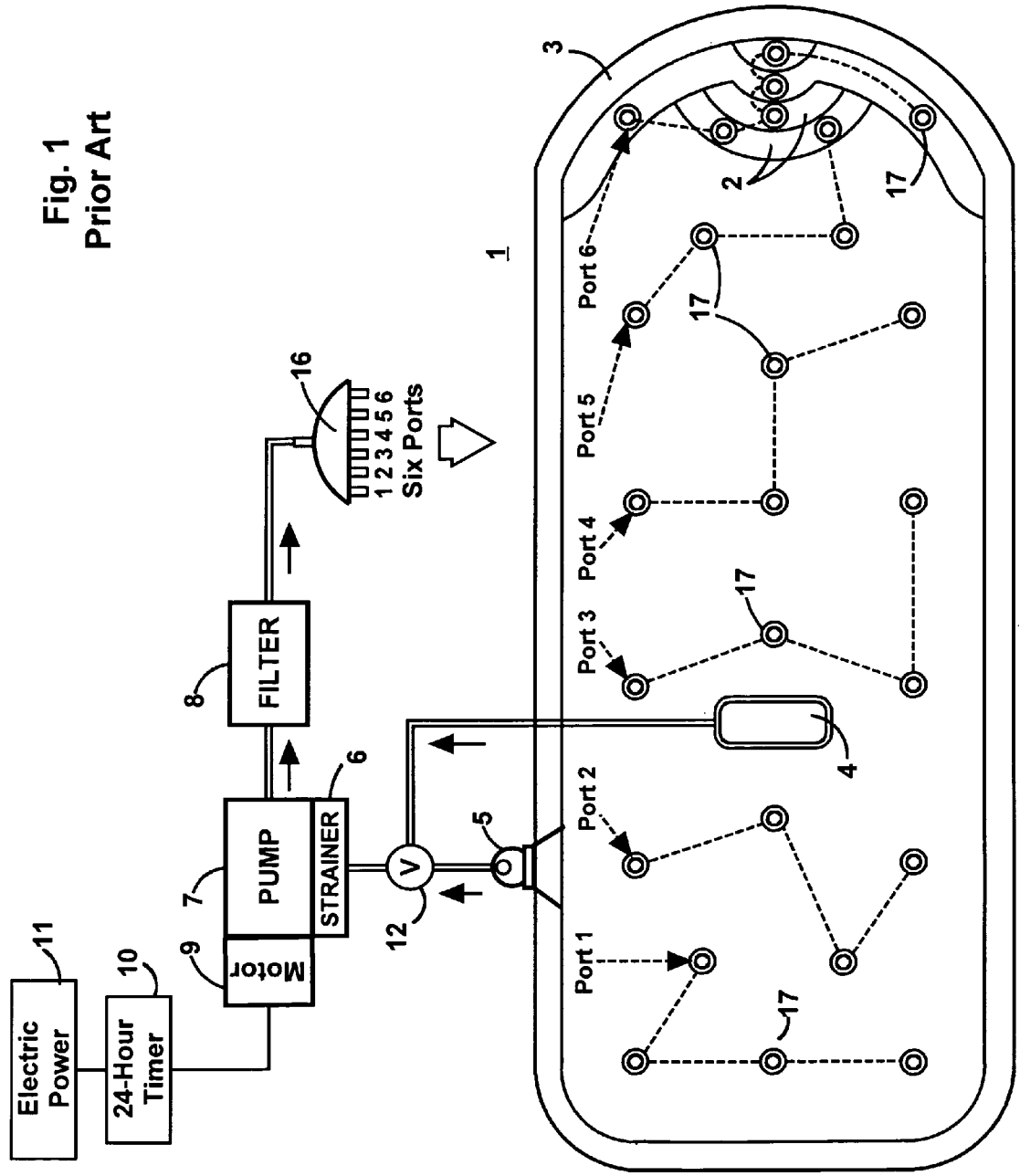
FIG. 1 shows the basic elements and configuration of a prior art swimming pool having an in-floor cleaning system.

FIG. 2, shows one representative set of four individual popup heads 27 commonly plumbed to the outlet Port 4 of the rotating valve 26. The other outlet ports of distribution valve 26 are in fluid communication with other sets of popup heads as generally shown in FIG. 1.

Figure 3A:
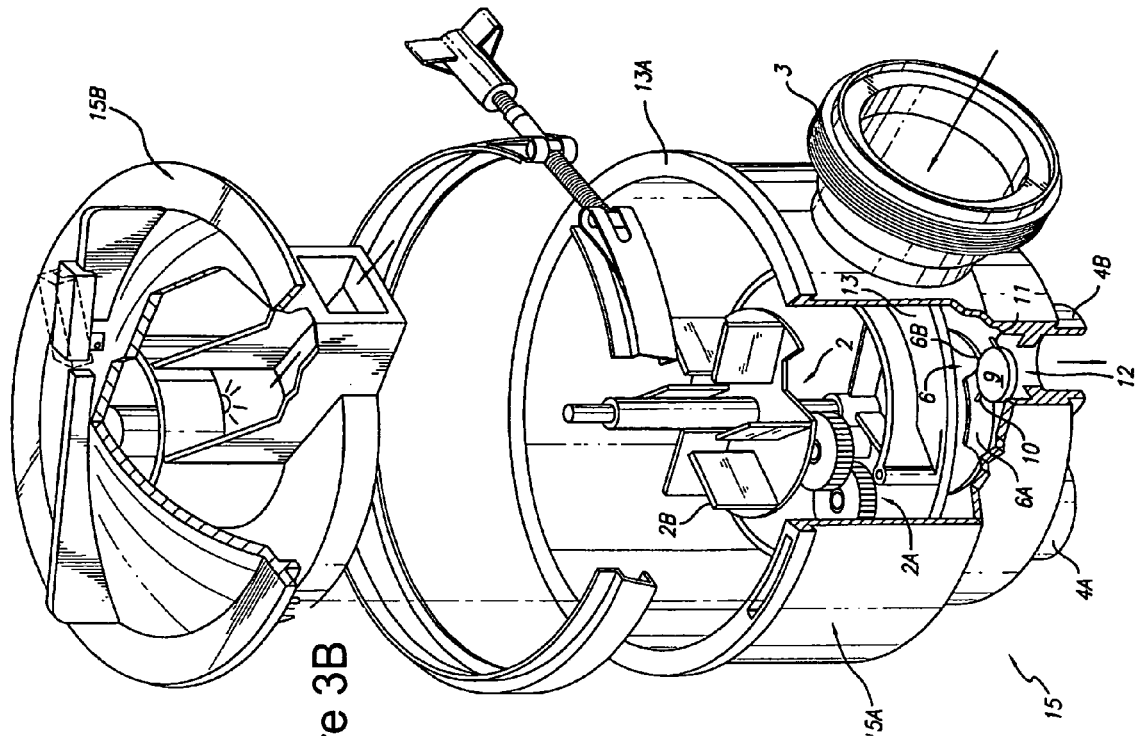
FIGS. 3A and 3B show two of the closest prior art distribution valves which are also suitable for direct conversion to embody the present invention.
Figure 3B:
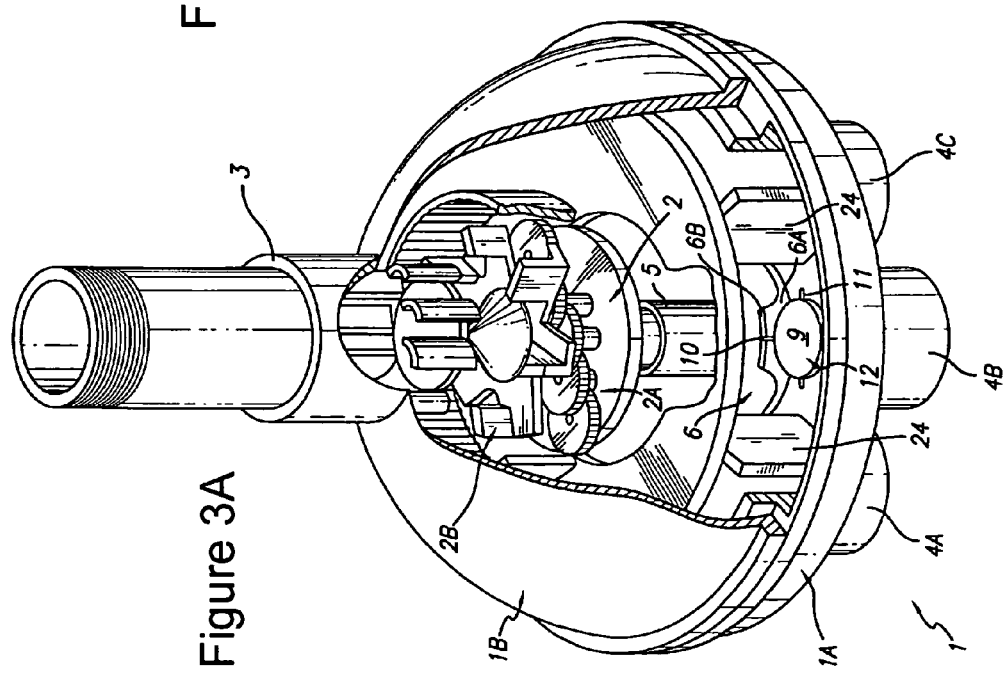
Figure 4A:
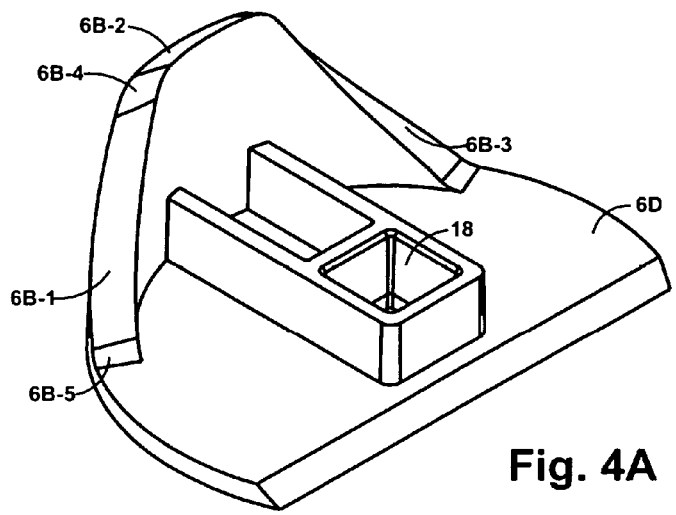
FIGS. 4A and 4B show the cam and the structural interrelation between the cam and outlet valves in the retrofitted distribution valves of FIGS. 3A and 3B.
Figure 4B:
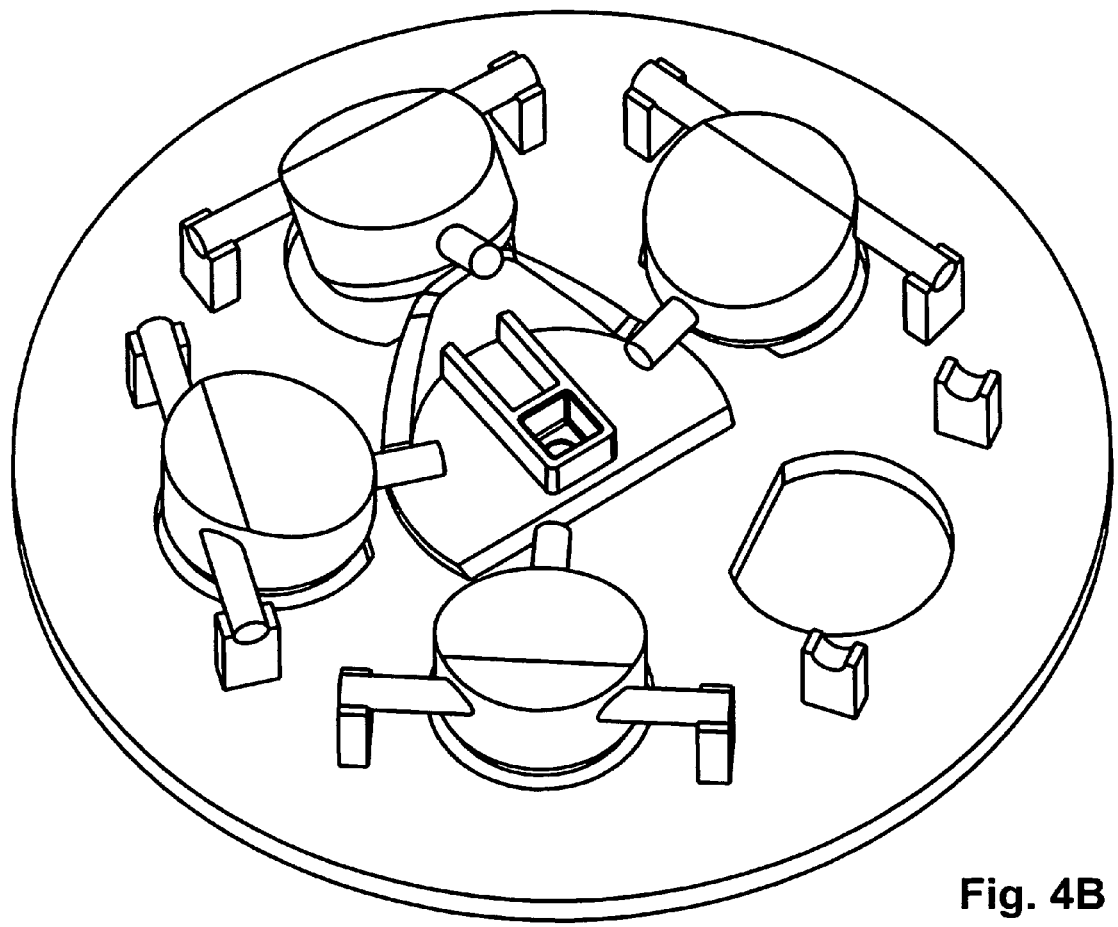

FIGS. 3A and 3B show two forms of prior art distribution valve that can be retrofitted for use in the new combinations of the present invention and/or to execute the new methods of the present invention. FIGS. 3A and 3B correspond to FIGS. 1A and 1B in the parent to the present application (U.S. Pat. No. 8,256,461). FIGS. 4A and 4B show the cam and the structural interrelation between the cam and outlet valves in the retrofitted distribution valves of FIGS. 3A and 3B. FIGS. 4A and 4B correspond to FIGS. 12 and 13 in the parent to the present application (U.S. Pat. No. 8,256,461).

3. Popup Cleaning Heads

In the embodiments of the invention tested during development, the popup heads used were Quik-Clean Style 3 (or "G3") heads sold by the A&A Division of Shasta Industries, Inc. and described in U.S. Pat. No. 6,971,588, incorporated herein by reference. FIGS. 5A and 5B are copies of FIGS. 1 and 2B from this patent. These figures show the basic functional elements of one form of popup head that can be used to form the new combinations of the present invention and/or to execute the new methods of the present invention.

As shown in FIGS. 1 and 2, popup heads are typically plumbed together in sets of between 3 and 7 heads, depending on (a) the character of the surface to be cleaned, (b) the inside diameter of the jet-forming aperture or nozzle (e.g., nozzle 24 in FIGS. 5A and 5B) located near the outlet or clearance opening (e.g., clearance opening 20 in FIGS. 5A and 5B) of the popup head, (c) the distance between adjacent heads, and (d) the water pressure or flow rate delivered to the set of popup heads from the distribution valve. The inside diameter of the jet-forming apertures in popup heads 27 is typically in the range between one-forth and three-quarters of an inch. In the preferred embodiments shown in FIG. 2 and in the embodiment of the invention subjected to comparative testing (see FIG. 8), the inside diameter of the jet-forming nozzle was 7/16 of an inch.

For any given swimming pool design, the number of popup heads 27 in each set of heads may vary. Likewise, the popup heads 27 in any particular set may have the same or different jet forming nozzle diameters. In general, the number popup heads in each set and their respective jet diameters will be balanced to approximately equalize the total flow to each of the sets of heads connected to the outlet ports of rotating valve 26.

4. Alternative Drain/Skimmer Connections

The embodiment of the invention shown in FIG. 2 includes a floor drain 28 and skimmer 29 configured as an alternative to the arrangement shown in FIG. 1, where the return flow to the suction side of the pump 7 is divided between the drain 4 and the skimmer 5 by means of three-way valve 12.

In FIG. 2 only the drain 28 is in fluid communication with the suction or inlet side of the pump 21. With this alternative arrangement, the suction capacity of pump 21 can be allocated entirely to drawing return water through the drain 28 and more effectively removing debris from the bottom of the pool 1 for separation at the strainer 22. As further described in a subsequent section, the skimmer 29 shown in FIG. 2 is configured to operate with pressurized flow from the outlet of pump 21, rather than return suction flow as is the case of skimmer 5 in FIG. 1.

The invention will provide substantial improvement in cleaning and/or energy efficiency with either of the basic skimmer/drain configurations shown in FIGS. 1 and 2.

A large canister-style, debris trap (not shown in FIG. 2) may also be included in the suction line between the drain 28 and the strainer 22 to capture the bulk of the debris that enters the drain 28. These canister-style traps retain larger volumes of debris and reduce the frequency with which the strainer 22 must be cleaned out. Canister-style traps are also more easily accessed for cleaning and their use tends to reduce the average restriction and back pressure that is attributable to accumulated debris in the return flow between the drain 28 and the pump 21. One example of this form of in-line debris trap is illustrated and described in U.S. Pat. No. 5,750,022 and another configuration is described in the context of an improved cleaning system in U.S. Pat. No. 6,057,627 (FIG. 3), both of these patents are incorporated herein by reference.

5. Standard and Debris-Removal Drains

The drain 28 may assume many different forms in existing swimming pools that have in-floor cleaning systems and that can be retrofitted for operation in accord with the present invention. Indeed, the present invention will provide increased efficiency when implemented with almost any kind of standard drain. However, in newly constructed swimming pools, where the selection of components is not subject to pre-existing structural and component limitations, a preferred choice would be a drain designed for enhanced debris-removal, provided the design also avoids the risk of swimmer entrapment and is otherwise VGB compliant. Two examples of highly improved drains that meet these standards were developed by the first named inventor on the present application and commercial versions are available from the A&A Division of Shasta Industries, Inc. One is a 10-inch round drain marketed under the product identification "PDR 2" and the other is a channel drain marketed under the product identification "AVSC." Both of these products are marked "Patent Pending" and filing information will be included here upon publication of the pending applications.

6. Standard, Venturi and Eductor-Augmented Skimmers

Figure 6A:
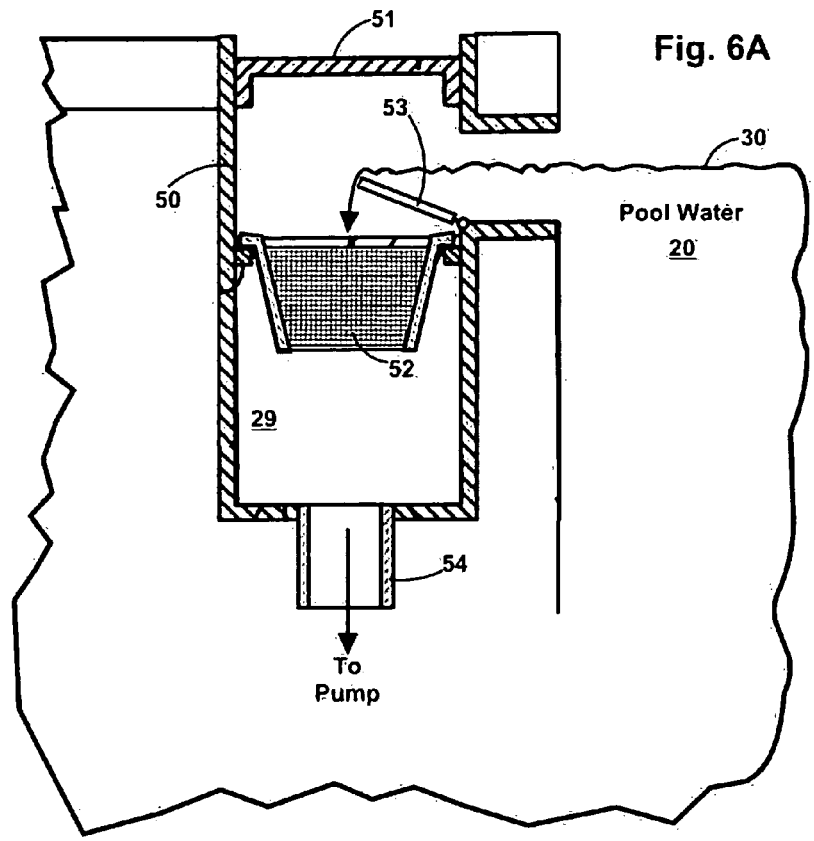
FIGS. 6A, 6B and 6C show three forms of skimmers suitable for use in alternative combinations of the present invention.
Figure 6B:
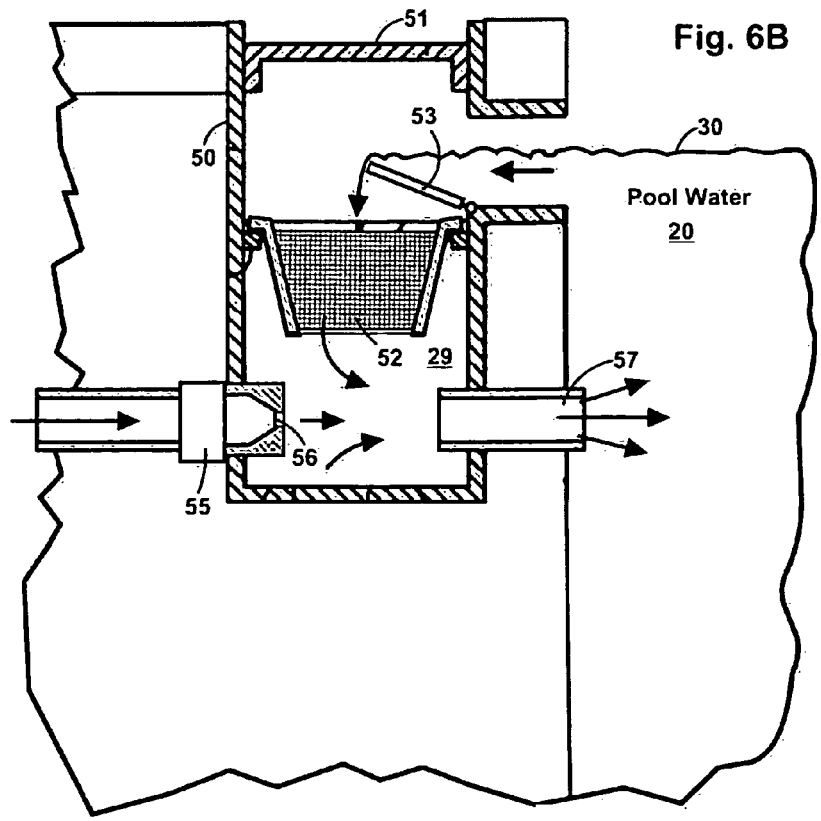
Figure 6C:
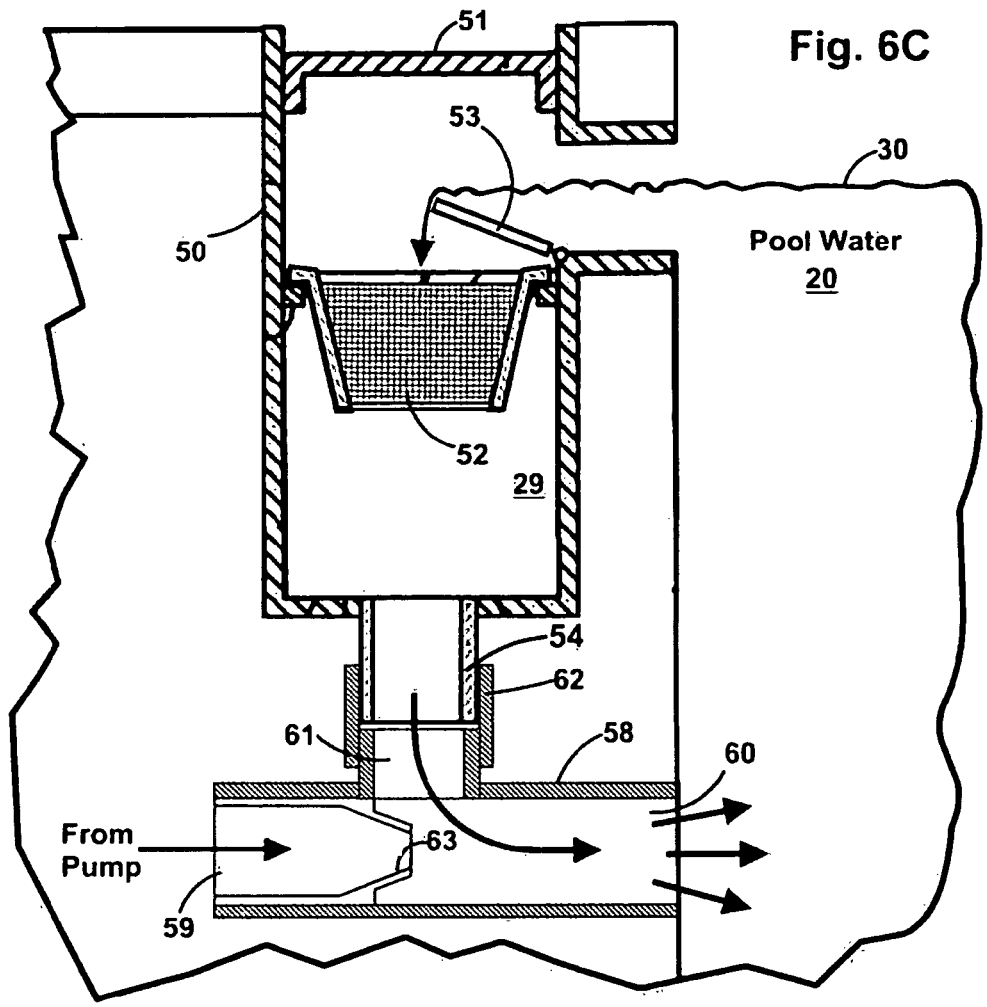

The skimmer 29 in FIG. 2 may assume many alternative forms; three such forms are shown installed in FIGS. 6A, 6B and 6C. All of these skimmers have housings 50 incorporated within the structural walls and deck of the pool 20. Each skimmer has a removable lid 51 that allows access to a removable mesh basket 52 that traps any debris drawn in with water from the surface 30 of the pool 20, over the pivoted floating weir 53, and into the lower body of the skimmer 29. The weir 53 allows floating debris to pass into the skimmer 29 but not float back into the pool 20 when the skimmer is not in operation. These three skimmer configurations are discussed below primarily in reference to the means used to draw water into the skimmer from the surface 30 of the pool.

The standard skimmer of FIG. 6A has an outlet port 54 connected to the suction or inlet side of the pump 7 as shown in FIG. 1. In this case, the volume of water drawn into the skimmer 5 is a function of the return flow rate into the pump 7. In many applications using this type of skimmer, the return flow to the pump is shared with the main drain 4, as shown in FIG. 1, where the flow is allocated between the skimmer 5 and the drain 4 by means of the three-way valve 12. In other common applications, a second port (not shown) at the bottom of the standard skimmer 29 (FIG. 6A) is in fluid communication with the drain 4 (FIG. 1) and an adjustable aperture at the bottom of the skimmer is used to allocate flow between the skimmer 5 and the drain 4.

The skimmer shown in FIG. 6B is often referred to as a venturi skimmer. This type of skimmer draws water from the surface of the pool 30 in response to pressurized flow from the outlet side of the pump (FIG. 2), rather than suction from the inlet side of the pump (FIG. 1). The inlet 55 is connected to the outlet of the pump and directs that pressurized flow into a nozzle 56, which forms a jet that that is directed to an aligned outlet 57. The outlet 57 extends through the lower wall of the skimmer and through the wall of the swimming pool 20. The high-pressure jet of water from nozzle 56 draws the water from the lower body of the skimmer toward and through the aligned outlet 57 and into the pool 20. The net amount of water that exits through outlet 57 is replaced by an equal inflow of water from the surface 30 of the pool. This surface inflow brings with it any floating debris, which is then trapped in the mesh basket 52 while the water flows down through the basket and back into the pool through outlet 57. Examples of this type of skimmer are shown in U.S. Pat. Nos. 6,022,481, 5,753,112, 4,826,591, 4,818,389 and 4,501,659, which are incorporated herein by reference.

The basic structure of the skimmer shown in FIG. 6C is the same as the standard skimmer 29 shown in FIG. 6A. This standard skimmer 29 can be installed with, or retrofitted to include, an eductor 58. The eductor 58 includes an inlet 59 connected to the pressurized outlet of the pump, an outlet 60 in fluid communications with the body of the pool 20 and a suction port 61 connected to the outlet port 54 of the skimmer 29 by means of coupler 62. The inlet 59 directs pressurized flow from the pump into a jet-producing nozzle 63. The pressurized flow from the outlet of the pump increases in velocity as it is forced through the nozzle 63. As this high-velocity flow rushes toward the outlet 60, it draws in and entrains water from port 61 and transports the combined flow through outlet 60 and into the pool 20. As water is drawn from port 61, suction is created at the bottom of skimmer 29, drawing in water from the pool surface 30 over the weir 53 and through the mesh basket 52. This form of eductor-augmented skimmer may be preferred in applications where an existing swimming pool has a standard skimmer and is being retrofitted to incorporate the present invention or in new installations having special design requirements or space limitations.

As shown in FIG. 2, an optional valve 32 can be used to set or adjust the optimal flow into the venturi skimmer 29, which may be either the internal type shown in FIG. 6B or the external type shown in FIG. 6C. Alternatively, a three-way valve 33 may be used to allocate the flow of pressurized water from the outlet of filter 23 between the distribution valve 26 and the venturi skimmer 29.

In one preferred embodiment described below, the three-way valve 33 (FIG. 2) is solenoid-actuated (Jandy 4717 3-Port 2-2.5 inch with Jandy Valve Actuator) and controlled by timer 26 on the basis of motor speed level. When the system is operating in the cleaning mode, about ten percent or less of the total flow typically goes to the skimmer 29 with the remainder going to the popup cleaning heads 27 through the distribution valve 26. In this preferred embodiment the motor 24 is variable speed motor 24 operates at a first, higher, speed during the cleaning cycle and at a second, substantially lower speed during an extended turnover cycle. During the cleaning cycle, the pressurized flow from the filter 23 flows through the three-way solenoid valve 33 to both the distribution valve 26 and the venturi skimmer 29. During the extended turnover cycle, the substantially reduced flow from the filter 23 goes in its substantial entirety to the venturi skimmer 29. This allocation of flow in relation to the higher motor speed required for cleaning and the lower motor speed required for filtration, sanitation and turnover, allows for (a) the minimization of the run time and/or motor speed required to complete the already shortened cleaning time required with operation of the current invention; and, (b) the opportunity to increase the daily turnover volume while operating the pump motor 24 at a much lower speed (400-700 rpm) with significantly lower energy consumption.

7. Venturi Flow Enhancement

Figure 7:
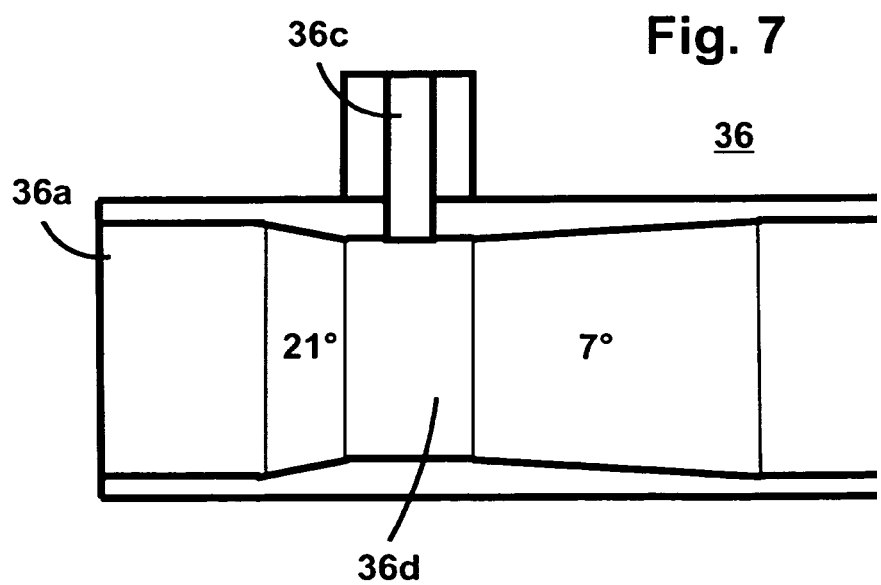
FIG. 7 shows the basic configuration for a 2-inch PVC in-line venturi for use in providing enhance flow to popup heads in one alternative embodiment of the invention.

As shown generally in FIG. 2 and by way of the example in FIG. 7, one alternative embodiment of the invention may include at least one venturi or eductor ("venturi") 36 in the pressurized flow between the outlet of filter 23 and the outlet or clearance opening (e.g., clearance opening 20 in FIGS. 5A and 5B) of at least one of the popup heads 27. The venturi 36 includes an inlet port 36a, an outlet port 36b and a suction port 36c. As further shown in FIG. 2, the suction port 36c is in fluid communication with an inlet 37 located within a reservoir of water, in this case the swimming pool 20 itself. As in the case of all venturi or eductor structures, pressurized flow through the venturi 36 produces a region of reduced pressure at suction port 36c drawing in a supplemental flow of water from the pool 20 through inlet 37. This supplemental flow may amount to between about five and thirty percent of the main flow from the pump 21 and filter 23. The combined flow from the outlet 36b will be distributed through the popup heads 27 distal to the venturi 36, increasing the mass flow of water from the outlets of these heads and increasing the effective cleaning of these heads. This increased capacity resulting from venturi-flow enhancement would be in addition to the measured increase achieved through the use of the improved cam in distribution valve 26, as disclosed and empirically quantified in the parent application (see FIGS. 15 and 16 and the related description).

8. Tradeoffs Associated with Venturi-Enhanced Flow

Venturi design is a well-known and predictable process based on the Bernoulli equation, conservation of energy, and the continuity equation for incompressible fluids such as water. Online calculators and other design tools are readily available for predicting the relation between the flow rate through a venturi having a particular geometry and the amount of suction produced by that flow. In deciding whether to combine a flow-enhancing venturi 36 as an additional element the present invention, it is important to consider the tradeoff between the amount of suction produced at inlet 36c (FIG. 2) and the flow resistance introduced by the venturi itself (i.e. the pressure drop between the inlet 36a and the outlet 36b).

In general, increased suction at port 36c (and increased supplemental flow to the heads) comes at the cost of an increased pressure drop from port 36a to port 36b (and decreased pressure at the heads). If the inlet 37 is located at or above the elevation of the venturi 36, then very limited suction will be required to draw a supplemental flow into venturi 36. A low suction requirement translates into a venturi that introduces an acceptably low pressure drop. Stated differently, a modest restriction of flow in venturi 36 can produce a meaningful enhancement of flow from inlet 37 and into suction inlet 36c. Another tradeoff affecting the decision to include a venturi involves a cost-benefit analysis: The cost of producing and installing the required number of venturi structures compared to the increased cleaning effectiveness of the resulting system. It is expected that a venturi of the type shown in FIG. 7 (and further described in the following section) could be cost-effectively produced by injection molding of two mirror-image halves that are sonically welded together to form a single unit suitable for direct incorporation into a standard 2-inch PVC plumbing system.

9. FIG. 7: Venturi Example

FIG. 7 shows a basic configuration of a venturi 36 that would be suitable for use in a two-inch diameter PVC pipe used to feed four popup heads 27 as shown in FIG. 2. The pressurized flow of water from the pump 21 would enter through the inlet port 36a and pass through a 21 degree tapered section in which the inside diameter is reduced from 2.05 inches to 1.75 inches. Since the water pressure from the pump 21 remains approximately constant, the rate at which the water flows through the tapered section of the venturi 36 increases in accord with the Bernoulli equation and related principles. At the end of the tapered section, the water flows at a higher velocity through a central section of the venturi that has a constant inside diameter (1.75"). The suction port 36*c* is in fluid communication with this central section, where the water velocity is higher but the pressure is lower than at the inlet 36*a*. This lower pressure draws water from the pool 20 through the inlet 37, into the suction port 36*c* and, after joining the main flow from the pump that enters through inlet 36*a*, the combined flow exits through outlet 36*b* and continues to the corresponding set of popup heads 27.

The combined flow from inlet port 36*a* and suction port 36*c* passes through a terminal section of the venturi having a reverse taper of approximately 7 degrees. Within this reverse taper, the inside diameter increases from the 1.75" diameter of the central section 36*d* back to the same 2.05" diameter that characterized the inlet port 36*a*. As the cross-sectional area increases in this reverse taper section, the rate of flow decreases toward its pre-venturi value at the inlet 36*a*. The difference between the pressure at inlet 36*a* and outlet 36*b* represents the pressure drop or head loss associated with the venturi itself. Published studies report that a 7 degree reverse taper after the central section 36*d* of a venturi of this type results in a measurably lower pressure loss across the entire length of the venturi (from inlet 36*a* to outlet 36*b*).

For any given pump pressure, the increase in the rate of flow between the inlet 36*a* and the central section 36*d* (where the suction port 36*c* joins the main flow) is inversely proportionate to the ratio of the cross-sectional areas of the venturi at beginning and end of the 21 degree taper. In other words, the velocity of flow increases as the inside diameter of the venturi decreases through the 21 degree tapered section. The difference in flow rates between the inlet 36*a* and the central section 36*d* results in a pressure differential between ports 36*a* and 36*c* with the pressure at suction port 36*c* being lower than the pressure at inlet 36*a*. A generally recognized equation for approximating the pressure differential between inlet port 36*a* and suction port 36*c* is stated as follows:

$$\Delta P = Pa - Pc = 0.05 p [1-(Aa/Ac)^2] \times (Q/Ac)^2 \qquad [1]$$

Where:
Q=flow rate of the water
Aa=cross sectional area of venturi 36 at inlet 36*a*
Ac=cross sectional area of venturi at the central section 36*d* junction
Pa=pressure at inlet 36*a*
Pc=pressure at suction port 36*c*
p=rho=fluid density For a venturi of the type shown in FIG. 7, made from PVC plastic and operated at a flow rate of 100 GPM, Equation [1] predicts a pressure differential of about one-half pound per square inch (psi), which, although relatively low for this flow rate, would draw a meaningful supplemental flow from the elevated inlet 37 located in the wall of the pool 20 (FIG. 2).

The venturi 36 will be designed to produce a supplemental flow in the range between about 5% and 30% of the main flow and ideally between about 20% and 25% of the main flow. At the lower end of the wider range, the incremental enhancement of flow to the popup heads 27 may not justify the cost of including the venturi. At the upper end of the wider range, the pressure drop across the venturi 36 (between ports 36*a* and 36*b*) may reduce performance of the popup heads 37 to an extent that substantially eliminates the advantage of the supplemental flow introduced by the venturi.

As to pressure loss introduced by a 2" venturi of the type shown in FIG. 7, which incorporates seven degree reverses taper, published empirical studies indicate a pressure loss between the inlet port and the outlet port of approximately 0.2 psi (1.1 kPa) at a flow rate 100 GPM. R. W. Miller, *Flow Measurement Engineering Handbook*, Second Edition, McGraw-Hill, 1989, Table "Permanent Pressure Loss Comparison (2" 527 LPM)". This is approximately equivalent to the pressure drop introduced by three feet of 2 inch diameter, Schedule 40, PVC pipe flowing at 100 GPM. A pressure drop of this limited magnitude would represent an easily acceptable tradeoff for increased flow to the popup heads 27 without the use of further pump capacity.

10. Alternative Venturi Locations

In FIG. 2, the venturi 36 is located at a point between an outlet port of the distribution valve 26 and one of the sets of popup heads 27. At this location, the venturi 36 will provide enhanced flow to the entire set of popup heads, although this enhanced flow will be apportioned based on the number of heads in the set, the diameter of the jet-producing apertures included in the heads and any differences in flow resistance between the outlet 36*b* and the inlets to the respective heads. One alternative would include a single flow enhancing venturi located in the line between the filter 23 and the improved distribution valve 26.

Referring to FIG. 2, another alternative would incorporate a separate flow-enhancing venturi for each of the popup heads 27. Such a venturi would be located between the individual feed line 38 leading to the inlet of popup head 27 and the outlet or clearance opening 39 of the corresponding head. This more distributed alternative would require a venturi and associated plumbing for each popup head that is to receive flow enhancement and the cost of these additional structures could exceed the benefit of the added flow and improved cleaning.

After substantial development of the present invention (and while working for a different organization), the first-named inventor conceived and developed a novel popup head that can produce venturi-enhanced flow by incorporating a venturi into the popup head 27 itself. A commercial version of this new popup head was first publicly disclosed by Shasta Industries, Inc. shortly before the filing of the present application. This improved popup head is being marketed under the names "G4" or "G4V" cleaning head" and "X-Treme Quik-Clean." The G4V Cleaning Head consists of a popup head that includes suction holes through the top of the head (15C in FIG. 5B) that allow supplemental water to be drawn into the pressurized flow of water as it exits the jet aperture (24A in FIGS. 5A and 5B) and proceeds through the outlet or clearance opening (20 in FIGS. 5A and 5B) of the popup head. It is expected that further investigation and testing will show the G4V Cleaning Head to be the preferred popup head for use in implementing the present invention, at least in those applications involving newly constructed swimming pools and in those existing pools with in-floor cleaning systems that can be readily adapted to incorporate G4V Cleaning Heads. The G4V Cleaning Heads are marked "Patent Pending" and filing information will be included here upon publication of the pending application.

11. Ozone Generator

Ozone Generators are increasingly being incorporated as an element of swimming pool filtration, circulation and cleaning systems. The introduction of ozone into the circulating flow of water aids in the process of sterilization and filtration. In the most highly energy efficient embodiments of the present invention, the role and benefits of an ozone generator can be greatly enhanced to the point where concurrently generated ozone plays a more dominate role in the overall sanitation of the swimming pool water, resulting in a reduction in chlorine use of up to 70% or more.

FIG. 2 shows an electrically operated ozone generator 40 receiving power through the timer 26 and injecting ozone into stand pipe 40*a* that feeds into the suction line from the drain 28 at an elevation that is below the water level 30 of the pool 20. A preferred form of ozone generator for use in this application is marketed under the name QuikPure3 by the A&A Division of Shasta Industries, Inc and is described U.S. Pat. No. 8,080,213, issued to the first-named inventor in the present application, assigned to the same assignee and incorporated herein by reference.

B. Measurement and Quantification of Increased Efficiency

1. Comparative Testing: Overview

To demonstrate and quantify the increased efficiency achieved with the improved cam and distribution valve at the center of the present invention, pressure and flow testing was conducted on an existing swimming pool: first, using the existing prior art distribution valve and then, under the same operating conditions, using the same prior art valve modified to include a cam of the present invention. The results of this testing are described below in relation to the swimming pool layout and instrumentation shown in FIG. 8.

2. Existing Pool and Testing Instrumentation

Figure 8:
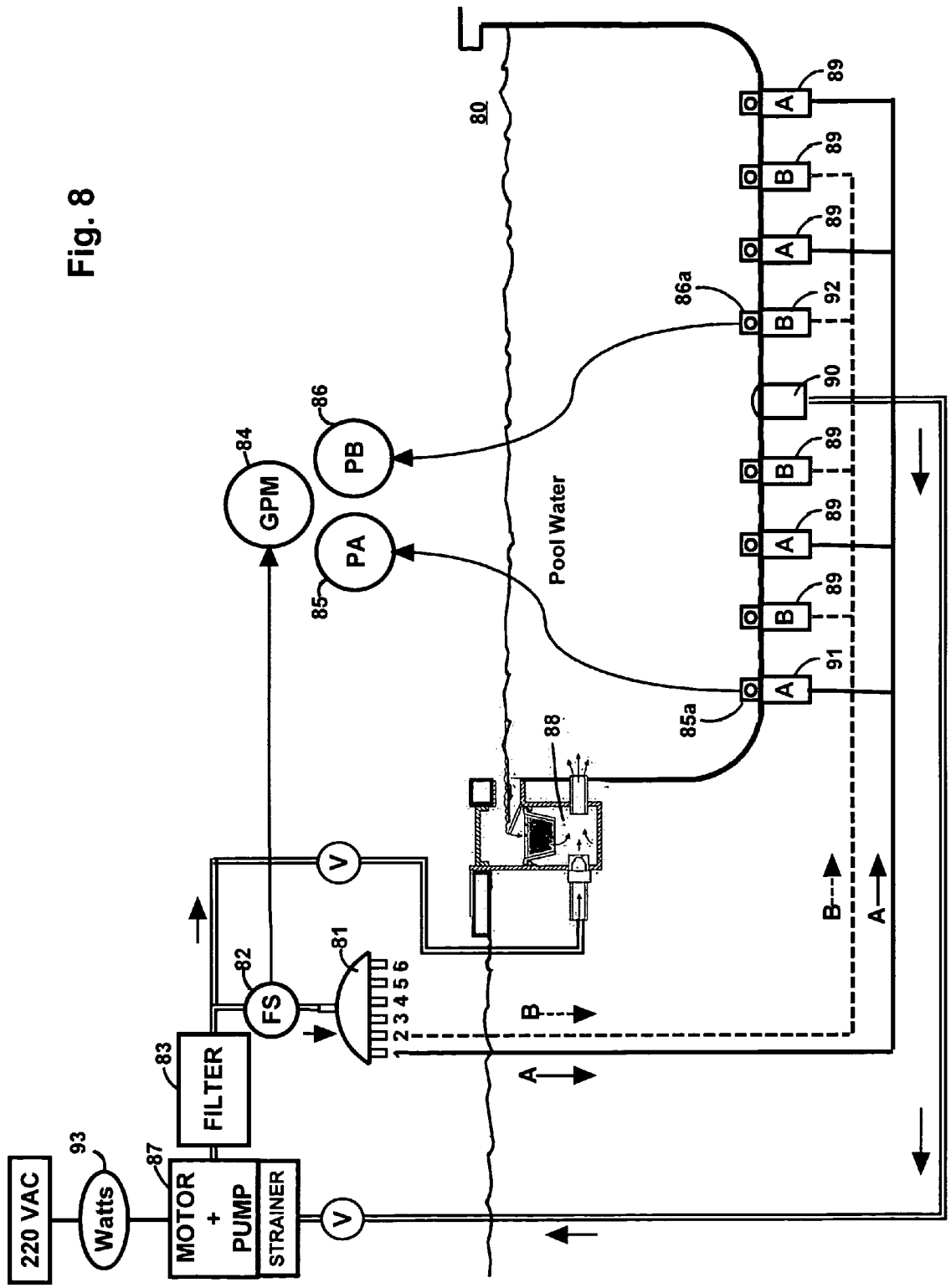
FIG. 8 shows a sectional view of an existing swimming pool with an in-floor cleaning system used to test and compare performance with and without implementation of the presentation.

As shown in FIG. 8, the existing pool 80, in which testing was conducted, includes a cleaning system having a distribution valve 81 connected to six sets of popup heads. Only two sets, having four heads each, are shown in FIG. 8 and these substantially identical sets are labeled A and B. All of the heads in sets A and B had jet-forming apertures measuring 7/16 of an inch in diameter. The four popup heads in set A were commonly plumbed to outlet port 1 on distribution valve 81 as indicated by the solid lines and flow arrows labeled A. The four popup heads in set B were commonly plumbed to outlet port 2 on distribution valve 81 as indicated by the broken lines and flow arrows labeled B. Since ports 1 and 2 of the distribution valve 81 are physically adjacent to one another, they open and close in sequence; that is, the outlet valve that controls port 2 is in the process of opening as the outlet valve that controls port 1 is closing. During this interim period when port 1 has not completely closed, flow exits from both of the adjacent ports 1 and 2. One objective of the present invention is to reduce or generally minimize this interim flow between adjacent ports without otherwise affecting the operation of the distribution valve 81.

A standard paddle-wheel flow sensor 82 was placed in the pipe between the filter 83 and the distribution valve 81 and was also connected to a matched flow meter 84 to continuously measure the total rate of flow into the distribution valve 81 in gallons per minute (GPM). Two pressure gauges 85 and 86 were separately connected to pressure sensors located in one of the popup heads (91 and 92) in each of the two sets of heads marked A and B. The gauges 85 and 86 continually measured the respective pressures in pounds per square inch (PSI) delivered to each set of popup heads A and B. Because the popup heads in sets A and B are fed by adjacent ports 1 and 2 in distribution valve 81, the pressure readings at gauges 85 and 86 continually show the pressures to which the two sets of heads are exposed, even during the interim period when the heads in set A are closing and the heads in set B are opening.

During operational testing, the total flow into the distribution valve 81 and the pressure on each of the two sets of heads (A and B) were continuously recorded and data was sampled at one second intervals. Since the jet-forming apertures in all of the popup heads in sets A and B had the same inside diameter (7/16"), the flow rate at each individual head was recorded as one-fourth of the total flow shown on meter 84.

The pre-existing cleaning system in which the testing was conducted, as illustrated in FIG. 8, included the following additional elements: (a) standard 2" diameter pressure-side plumbing and 2.5" diameter suction-side plumbing between the drain 90 and the pump/motor 87; (b) commercially available Quik Clean G3 popup cleaning heads 89 with 7/16" diameter jet-forming apertures as manufactured by the A&A Division of Shasta Industries (FIGS. 5A and 5B) as described in U.S. Pat. No. 6,971,588; (c) a six-port rotating distribution valve 81 manufactured by the A&A Division of Shasta Industries, having a gear train, cam and valve system as described in U.S. Pat. Nos. 6,539,967 and 6,325,087; (d) an EcoSkim internal venturi skimmer 88 manufactured by the A&A Division of Shasta Industries (shown generally in FIG. 6B); (e) an AVSC drain 90 manufactured by the A&A Division of Shasta Industries; (f) a three-way solenoid actuated valve 33 manufactured by Jandy (4717 3-Port 2-2.5 inch) with a Jandy Valve Actuator; and, (g) an Intelliflo® variable speed pump/motor combination 87 manufactured by Pentair Water Pool and Spa, Inc as generally described and illustrated in U.S. Pat. No. 8,019,479, incorporated herein by reference.

The Intelliflow® variable speed pump motor 87, provided real-time output readings on motor speed in revolutions per minute (rpm) and the level of power consumption in watts. Solely for illustration purposes, a separate watt meter 93 is shown in FIG. 8, when in fact, this power measurement was provided as an output from the pump/motor combination 87 already installed on the pool 80.

3. Representative Data Set: Present Invention Operating at 3450 RPM

Figure 9:
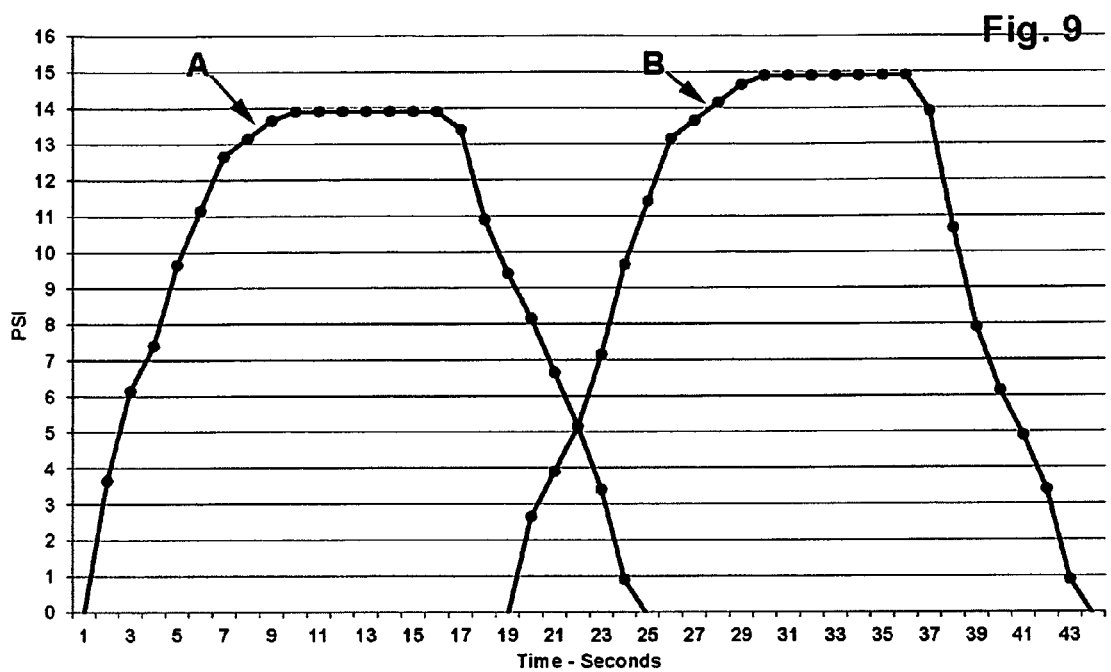
FIG. 9 is a plot of a representative data set recorded from tests performed on the instrumented pool shown in FIG. 8.

FIG. 9 is a plot of the actual data points recorded by the two gauges 85 and 86 connected to the corresponding pressure sensors 85a and 86a as shown in FIG. 8. These pressures were recorded as the cam of the present invention (FIG. 4A) rotated in the otherwise prior art distribution valve 81 and sequentially opened and closed two adjacent outlet valves (FIG. 4B) that control flow from the two outlet ports (valve 81, ports 1 and 2) separately connected to the two sets of popup heads labeled A and B in FIG. 8. When this data was recorded, the pump motor 87 was set to run at the standard fixed-speed rate of 3450 revolutions per minute (rpm). This produced an average measured flow of 105 gallons per minute (gpm) through the flow sensor 82, into the distribution valve 81 and through the open outlet port of distribution valve 81. This total flow of 105 GPM at the sensor 82 is equivalent to about 26 gpm through each of the four heads in either of the sets of heads A or B.

In FIG. 9, the two plots marked A and B correspond to the pressure delivered to each of the popup up heads in set A and set B as shown in FIG. 8. In this example, approximately 25 seconds was required to open and close one of the two adjacent outlet valves connected to either set A or set B. The two plots A and B overlap between times 19 and 25 seconds, halfway through the recorded data shown in the chart of FIG. 9. This overlap corresponds to the period when the outlet valve controlling set A is closing and the outlet valve controlling set B is opening. A portion of the increased efficiency achieved by the present invention is due to the limiting of this concurrent flow through adjacent outlet ports of distribution vale 81. As indicated in FIG. 9, the total time required to open and close the two adjacent outlet ports connected to sets A and B was approximately 43 seconds. Since the distribution valve 81 has six outlet ports the total time required for one full revolution would be approximately 129 seconds (3×43 seconds) or about 2 minutes. In general this full revolution time will vary in inverse proportion to the rate of flow through the distribution valve 81.

The shape of the data plotted in FIG. 9 is characteristic of the pressure distribution to popup heads activated by a distribution valve of the type shown in FIGS. 3A and 3B when operated using a cam (FIGS. 4A and 4B) that embodies the present invention. It is believed that the slight variations in peak pressure and data shape as between ports A and B are due primarily to different plumbing distances and connections between the distribution valve 81 and the corresponding sets of popup heads A and B.

4. Comparative Data: Invention vs. Prior Art (3450 RPM)

FIG. 10A includes pressure plots for two sets of popup heads (A and B) recorded with the pump motor 87 in FIG. 8 running at 3450 RPM. The broken-line plots correspond to the use of a prior art distribution valve. The solid-line plots correspond to use of the same distribution valve retrofitted with the cam of the present invention (FIGS. 4A and 4B) in place of the prior art cam. Each data set includes pressure values for the same two sets (A and B) of popup valves shown in FIG. 8.

Concurrent with the recordation of the pressure data shown in FIG. 10A, the total flow into the distribution valve 81 was also recorded in gallons per minute. This was accomplished by means of an inline flow sensor 82 and a flow meter 84 as shown in FIG. 8. This data was normalized to a per-head value by dividing the total flow by four, since both sets A and B included the same number of heads (4) and all of the heads had the same diameter jet-forming aperture (7/16"). FIG. 10B includes plots of this normalized flow data, with the flow rates resulting from use of the prior art shown in a broken-line curve and the flow rates resulting from use of the present invention shown in a solid-line curve.

5. Comparative Data: Invention vs. Prior Art (3000 RPM)

Figure 11A:
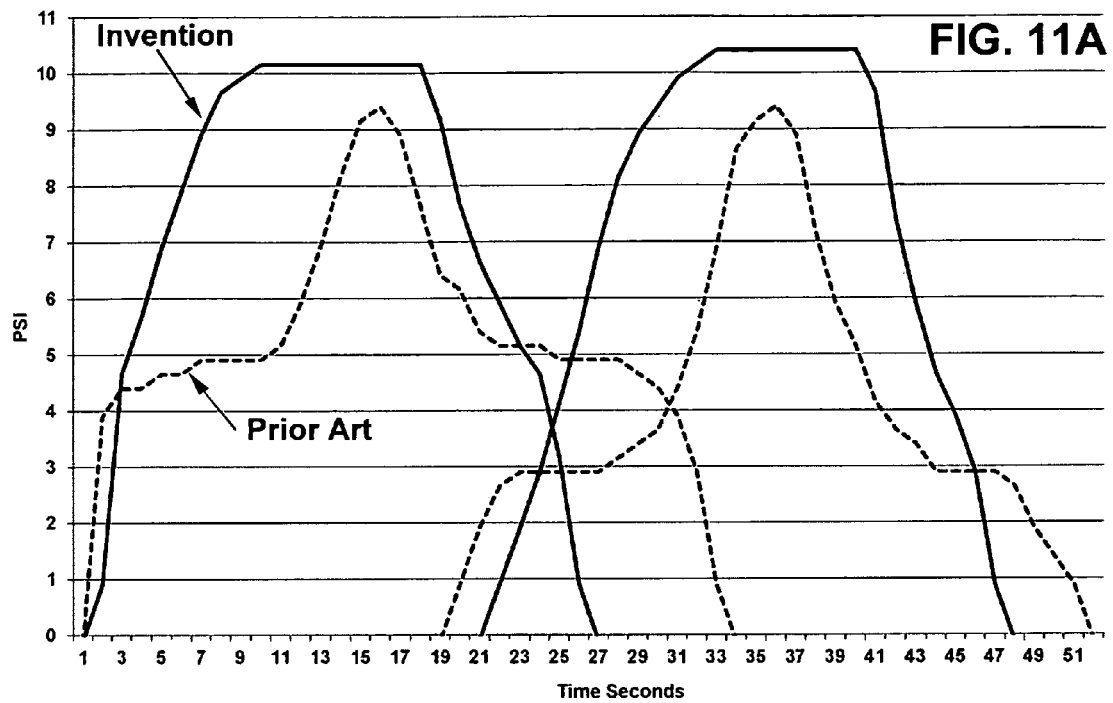
FIGS. 11A and 11B are plots of data sets recorded when the pool shown in FIG. 8 was operated at a motor speed of 3000 rpm with and without the present invention.
Figure 11B:
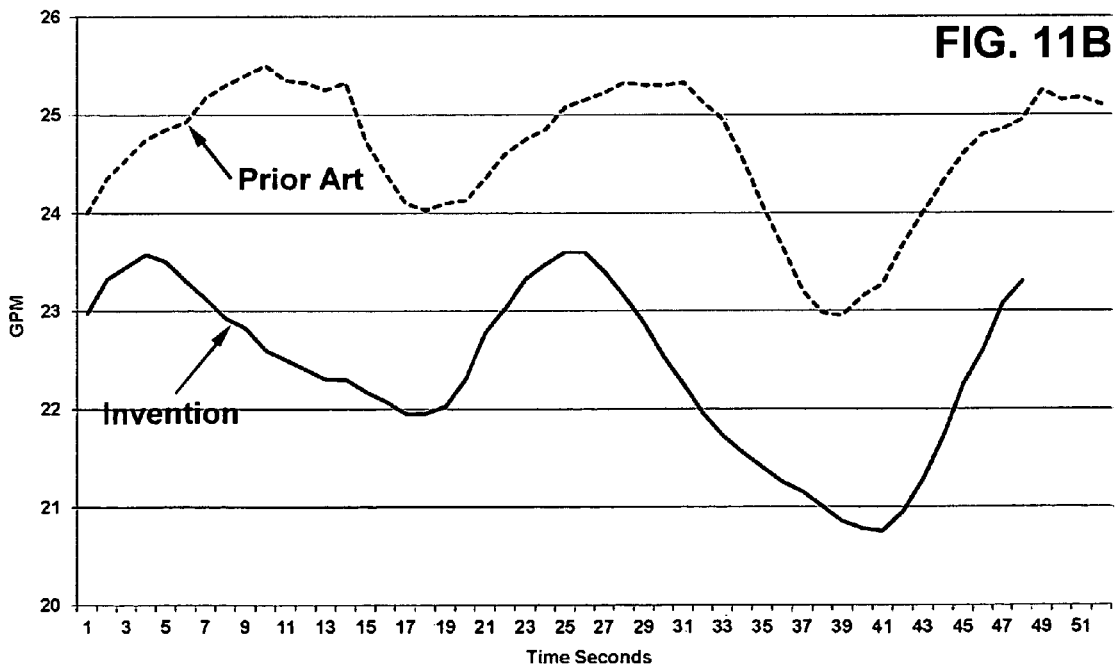

The data plotted in FIGS. 11A and 11B were recorded under the same conditions as the corresponding data plotted in FIGS. 10A and 10B, except for the speed of the pump motor 87 in FIG. 8, which was reduced from 3450 RPM to 3000 RPM. Again, the broken-line plots represent the data recorded when a prior art distribution valve 81 was operating and the solid-line plots represent the data recorded after the prior art distribution valve was retrofitted with a replacement cam of the present invention.

6. Dwell Time and the Dwell Factor

As previously noted, "dwell time" is the period during which a popup head is activated and receives a flow of water at a peak pressure. Dwell time is increased through use of a distribution valve that embodies the present invention and, as a result, there is an appreciable increase in the effective cleaning area associated with popup heads. The improved distribution valves of the present invention execute two basic steps to accomplish increased dwell time: (1) reducing or generally minimizing the duration of concurrent flow through adjacent outlets of the distribution valve and (2) increasing or generally maximizing the duration of flow to said popup heads at a pressure that equals or preferably exceeds a predetermined minimum operating pressure associated with said popup heads. This simple methodology has been shown to substantially increase the functional dwell time without any modification to the popup heads, while increasing the effective cleaning area of the popup heads by a factor of between 30% and 75% compared to identical heads operated under identical conditions using the same distribution valve incorporating a prior art cam (see FIGS. 14 through 16 in the parent application).

The comparative data presented in FIGS. 10A and 11A show that increased cleaning capacity is more meaningfully characterized in terms of the actual pressures at which the cleaning heads operate over the entire dwell time. For example, in operation of the system shown in FIG. 8, the popup heads in both sets A and B were fully extended and operating at a head pressure of less than 6 psi. At a minimum operating pressure of 6 or 7 psi, the cleaning jets emitted by the heads were fully functional in moving debris on the surfaces of the pool; however, better cleaning is typically achieved at pressures above the minimum. This being the case, cleaning performance can be more meaningful defined and compared in terms of a "Dwell Factor," defined as the summation (or integration)—over each one second interval of the dwell time—of the difference between the actual head pressure and the minimum operating pressure. In simple graphic terms, this amounts to the area under the pressure curve and above the line that defines the minimum operating pressure.

FIG. 9 shows the measured head pressures as the improved distribution valve 81 in FIG. 8 rotates through the opening and closing of two adjacent outlet ports that are separately connected to two sets (A and B) of popup heads. This same data is shown in FIG. 12 where the two head pressure curves A and B have been (a) labeled to show the two corresponding dwell times and (b) shaded to show the two areas under the A and B pressure curves and above the minimum operating pressure of 6 psi. These two shaded areas, added together, represent the Dwell Factor for this combination of improved distribution valve and prior art popup heads. For any given combination, the higher the Dwell Factor, the higher the cleaning capacity available for allocation to either improved cleaning function or improved energy efficiency.

For the data shown in FIG. 12, the Dwell Factor was determined by (a) subtracting the minimum operating pressure (6 or 7 psi) from the pressure reading recorded during each second of the dwell times for the popup heads in sets A and B and (b) totaling the resulting figures. In this case, the use of an improved distribution valve embodying the present invention and operated at a pump speed of 3450 rpm, the Dwell Factor was 658. The table in FIG. 13 compares the Dwell Factor values derived from the data shown in FIGS. 10A and 11A and showing these values based upon two minimum operating pressures (6 and 7 psi) and at two pump motor speeds (3450 and 3000 rpm).

The table in FIG. 14 compares the pump motor speed with other data taken in relation to the test configuration of FIG. 8 and the collected data plotted in FIGS. 10A, 10B, 11A and 11C. FIG. 14 shows that when compared to the prior art, use of a distribution valve of the present invention (at both motor speeds) results in higher peak pressure at the heads with lower average total flow into the heads. The power consumption values in FIG. 14 are rounded from actually measured values of 2963 watts (about 3 kW) at a motor speed of 3450 rpms and 1970 watts (about 2 kW) at a motor speed of 3000 rpms.

Those skilled in the art will understand that the inline filter 83 (FIG. 8) will normally restrict flow and increase back pressure to the extent that it has not been recently cleaned or back flushed to remove accumulated debris and particles. The more in need of cleaning, the more the filter 83 restricts flow and the more power is consumed by the pump motor 87 to achieve the same head pressures and overall flow into the cleaning system. By way of example, wattage readings were taken on the same swimming pool depicted in FIG. 8 after the existing filter media was replaced with new media and the wattage readings at 3450 and 3000 rpms were about 10% lower with the clean filter media. Thus, while the operating pressure driving the cleaning system on any particular day can vary depending on filter back pressure, the relative cleaning efficiency of the system (other factors held constant) will remain the same.

As shown graphically in FIGS. 10A and 11A and quantified in the table of FIG. 13, use of a distribution valve that embodies the present invention in the system of FIGS. 2 and 8 results in substantially increased cleaning capacity. This increased capacity has been measured in terms of (a) an increase in the dwell time that the heads are exposed to peak pressure as shown in FIG. 14 in the parent application (280%); (b) an approximately 75% increase in the effective cleaning area for heads having the same jet-orifice diameter as the heads used the embodiments of FIGS. 2 and 8, as shown in FIG. 15 of the parent application; (c) an increase in the range of 64% to 213% in the Dwell Factor measure of cleaning capacity as shown in the table of FIG. 13; and (d) significantly higher peak head pressures accompanied by proportionately lower flow rates into the heads over a range of motor speeds, directly resulting in enhanced cleaning capacity and lower levels of power consumption as shown in the table of FIG. 14.

A more intuitive and visual sense of the increased cleaning capacity provided though use of the present invention can be appreciated simply by examining the area between the solid and broken lines in FIGS. 10A and 11A and above the minimum operating pressure of 6 psi. This area, when divided by the area under the broken line but above 6 psi, provides a proportionate indication of the increase in cleaning capacity provided by the invention as compare to the closest possible prior art. Likewise, FIGS. 10B and 11B show that the prior art, which is characterized by substantially lower cleaning capacity compared to the present invention, nonetheless requires a higher flow rate from the pump to achieve this inferior level of cleaning performance.

7. Motor Speed Impact on Power, Head Pressure and Total Flow.

Figure 15A:
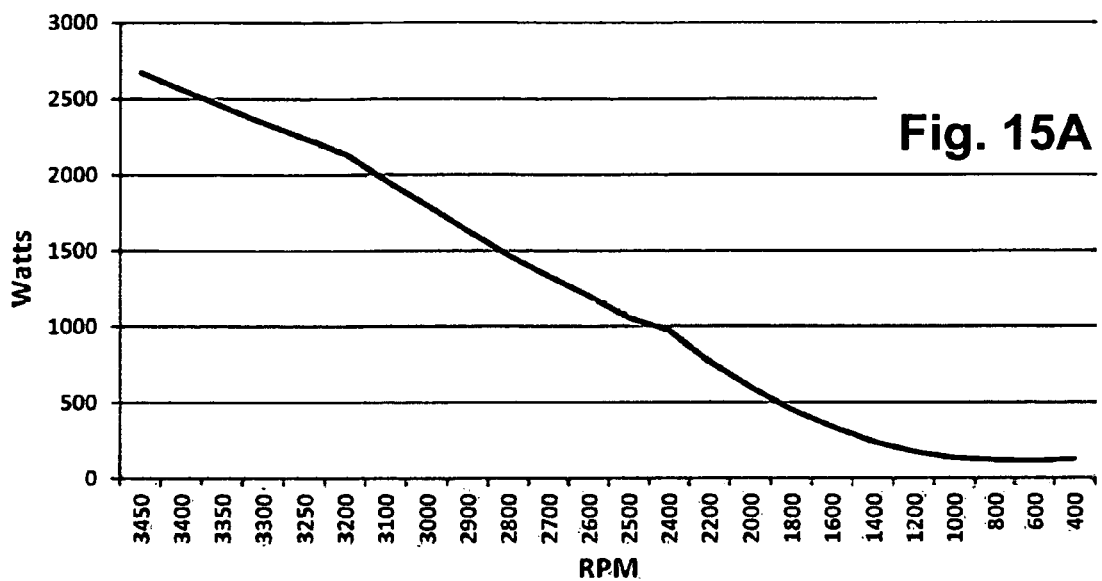
FIGS. 15A, 15B and 15C are plots of data sets recorded when the pool shown in FIG. 8 was operated over a range of different motor speeds between about 400 and 3450 rpm.
Figure 15B:
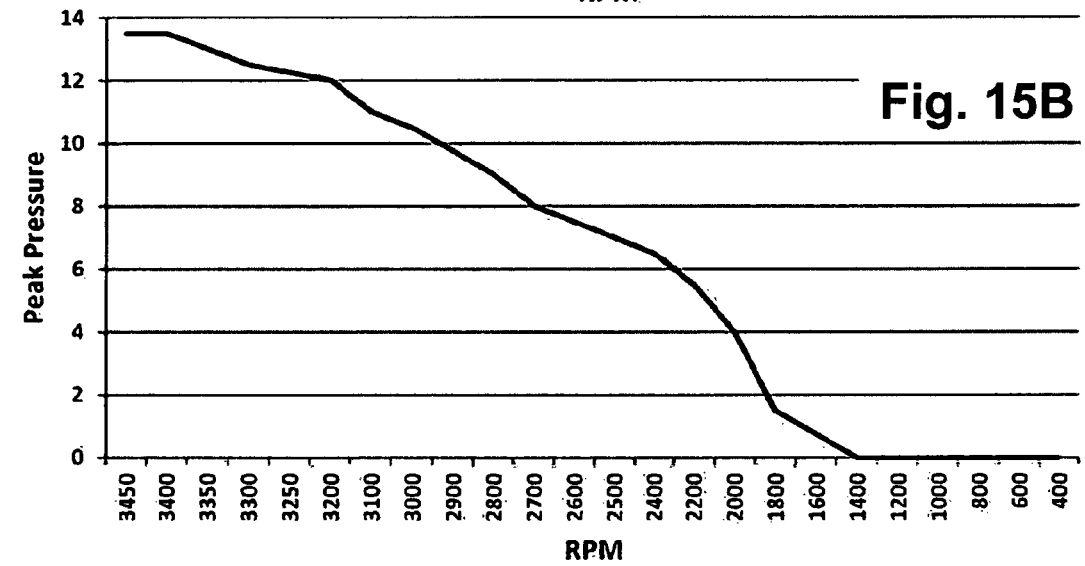
Figure 15C:
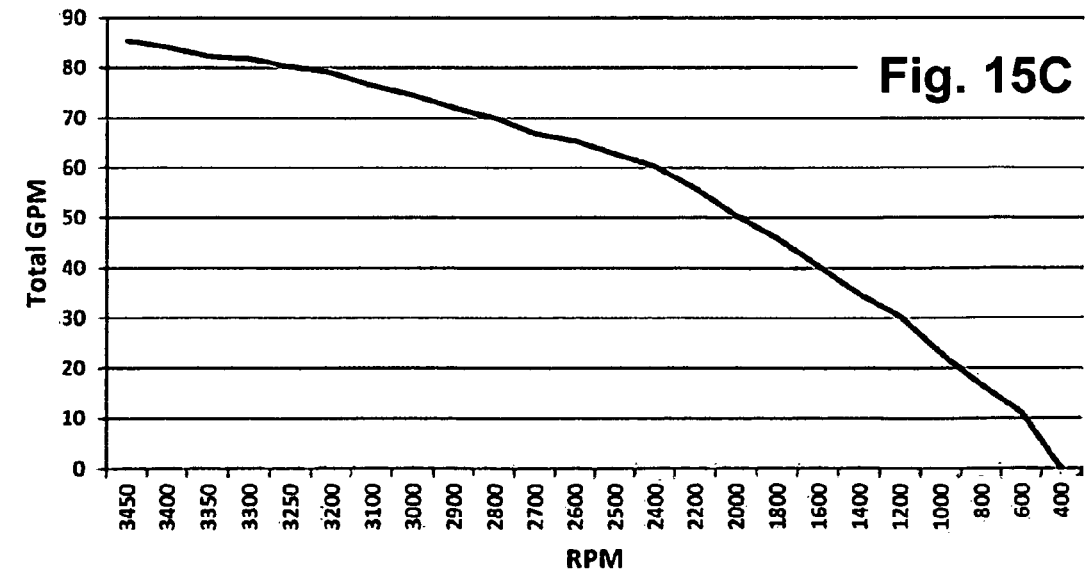

FIGS. 15A, 15B and 15C are plots of data sets recorded in relation to the same pre-existing swimming pool 80 depicted in FIG. 8 and operated in the collection of the data shown in FIGS. 9 through 14. The three data sets show the relationship between the speed of the pump/motor 87 in FIG. 8 and: (a) the corresponding level of power required by the pump/motor 87 for the particular loading conditions, as measured in watts (FIG. 15A); (b) the peak pressure at the popup heads, as indicated on gauges 85,86 in pounds per square inch (FIG. 15B); and (c) the total flow into the distribution valve 81, as indicated on flow meter 84 in gallons per minute. This data provides helpful insight in evaluating the impact of increased cleaning capacity as indicated by the data shown in FIGS. 9 through 12 and the impact of trading this increased cleaning capacity for energy efficiency through a reduction in the run time or speed of the pump/motor 87. For example, FIGS. 15A and 15B can be read together to predict that a motor speed of about 2400 rpm would represent the approximate lower limit for effective cleaning for popup heads having a minimum operating pressure of 6 psi. The flow and power data of FIGS. 15A and 15C aids in estimating the energy savings that result from increased turnover time, especially at very low motor speeds (400-600 rpm). These same two data sets also show that long term circulation for filtration, sanitation of simple water features can be most economically accomplished at motor speeds below about 1200 where the power curve flattens out. It should be noted that the values presented in these three figures are slightly lower than the values recorded in FIGS. 9-14. This has been attributed to the fact that the media in filter 83 was cleaned between the two data collections C. Efficiency Allocation: Retrofitting Existing Pools vs. New Pool Construction The distribution valve of the present invention, when used in combination with other system components, substantially increases the cleaning capacity of in-floor cleaning systems of the type shown in FIGS. 2 and 8. One way to take advantage of this increased cleaning capacity, at least in the case of new swimming pool construction, is to set the popup heads 27 further apart to account for the increased cleaning reach achieved though use of the invention. This allows the pool to be built at a materially lower cost since it has fewer popup heads and a reduction in associated plumbing and circulation capacity. This reduction in initial cost provides a meaningful competitive advantage in the sale of newly constructed swimming pools.

By contrast, existing swimming pools with in-floor cleaning systems already have popup heads that are physically spaced apart on the basis of some prior art design model. The cost of re-spacing and reducing the number of popup heads in an existing pool would exceed any associated savings from increased cleaning capacity. However, where existing pools are retrofitted with the present invention, the increase in cleaning efficiency achieved by the invention can be traded off in favor of reductions in pool motor run time and/or speed, resulting in substantial savings in the cost of electrical energy. In other words, an existing swimming pool that has been retrofitted with the present invention will have increased—but excessive—cleaning capacity. This excess cleaning capacity can be sacrificed by decreasing the run time or speed of the pump motor, which will produce substantial utility savings while returning the pool to the same level of cleaning capacity it was designed to achieve originally. By way of general example, if the present invention increases the cleaning capacity of an existing in-floor cleaning system by 50%, then the run time of the pool motor can be reduced by approximately the same amount. Alternatively, the speed at which the pool motor runs can be reduced to a speed that is commensurate with equivalent cleaning by the prior art system when operated at a higher and more energy intensive motor speed. In either case, the use of electrical energy will be significantly reduced.

Historically, the time required for completion of the automatic cleaning process has exceeded the time to turnover the water in the pool for filtration purposes. With the present invention's reduction of cleaning time and the introduction of venturi-enhanced flow through the popup heads, the turnover time for average sized pools approximates the time required for cleaning with an in-floor system. It is now possible to clean and turn over an average existing pool retrofitted with the present invention in 40-60% of the time the time that was required using the prior art filtration and cleaning system.

D. Allocation and Impact of Improved Efficiency

1. Two Basic Energy Demands: Cleaning and Turnover

Figure 16:
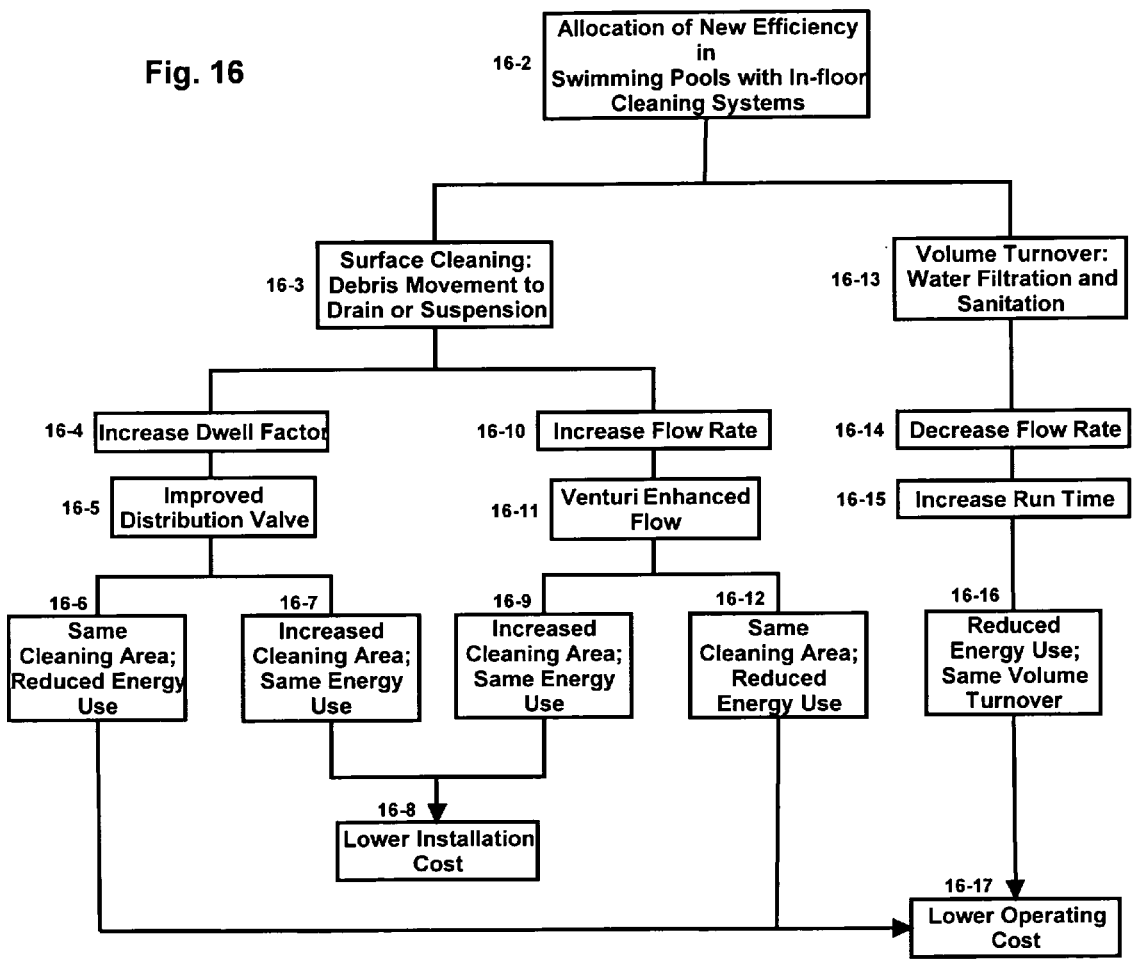
FIG. 16 is a flowchart presenting a functional view of the alternative but somewhat overlapping objectives of the present invention in either lowering installation costs associated with new in-floor cleaning systems or lowering the operating costs of new or existing systems, primarily through energy savings.

The flow chart of FIG. 15 presents a functional view of the alternative paths that may be taken to the largely alternative but somewhat overlapping objectives of the present invention; namely, either lowering installation costs associated with new in-floor cleaning systems or lowering the operating costs of new or existing systems, primarily through energy savings. FIG. 16 shows the two main factors that place demand on the pump motor and thus affect the amount of energy required to operate a pool: first, there is the amount of pump run time and/or pump speed required to adequately turnover the volume of water in the pool during any 24-hour period for filtration and sanitation purposes (box 16-13); and, second, there is the amount of run time and/or pump speed required to adequately clean the surfaces of the pool (box 16-3).

2. Example

High Level System

The turnover time for residential pools is generally recognized as the time required for the pump to circulate a volume of water though the filter that equals the total volume of the pool. The only practical way to reduce the amount of energy used to accomplish one turnover is to run the motor at a lower speed (FIG. 16, box 16-14) and do so over a longer period of time (FIG. 16, box 16-15). As noted previously in relation to FIG. 2, this can be accomplished with the use of a variable speed pump motor 24 and a solenoid-actuated, three-way valve 33 that is controlled by timer 26.

During the cleaning cycle, when the popup heads 27 are in sequential operation, the three-way valve 33 allows flow to both the distribution valve 26 and to the venturi skimmer 29. Because the cross-sectional area of the nozzle 56 in the skimmer 29 (see FIG. 6B) is small when compared to the combined cross-sectional areas of the four jet-forming apertures in the popup heads 27 commonly plumbed to one port of the distribution valve 26, most of the flow from the filter 23 will go to the popup heads 27. During the cleaning phase it is normal for less than 10% of the total flow to go to the venturi skimmer 29. However, with just 7 or 8 gallons per minute flowing into the venturi inlet 55 (FIG. 6B) the skimmer 29 will typically draw in 50 to 70 gallons per minute from the surface 30 of the pool, over the floating weir 53 and through the basket 52.

With the improved system of the present invention, the variable speed motor 24 (FIG. 2) was operated at 3000 rpm rather than the normal speed of 3450 rpm that is typical for fixed speed motors. At 3000 rpm, the existing swimming pool 20 cleaned as well or better than it did with the prior art system when operated at 3450 rpm, but required only 2340 watts as opposed to 2970 watts when operated at 3450 rpm. When the cleaning cycle has been completed, the speed of the motor 24 is substantially reduced for operation during an additional (optional) turnover phase. When the motor 24 is operated at the reduced speed, the three-way valve 33 is actuated to direct all or a substantial portion of the reduced flow from the filter 23 to the venturi 29. During this low-flow turnover phase, the motor 24 is operating at about 600 rpm and drawing only 112 watts.

This example of the present invention demonstrates the significant energy savings that can be achieved if the increased cleaning efficiency of the system is traded off for energy savings while maintaining the same level of cleaning realized through use of the prior art. A typical prior art system of the type shown in FIG. 1 would incorporate a prior art distribution valve and a single speed, 1.5 hp, motor that operates at the standard speed of 3450 RPM and 2970 watts. This filtration and cleaning system would normally be operated for eight hours per day with a daily energy consumption of about 24 kilowatt-hours (kWh). By comparison, the improved system described the preceding paragraph would operate about 4.5 hours in the cleaning phase during which it would consume 10.5 kWh. During this improved cleaning phase the pump 24 would be circulating water through the popup heads 27 at an average rate of about 75 GPM and would, during this cleaning cycle turnover some 20,000 gallons of water, a volume that is equivalent to the volume of an average swimming pool constructed during the first decade of this century (20,000 gallons). If the pool was larger or if additional filtration was desired, the circulation system could continue to operate for up to 19.5 hours more during the same one day period. However, for an average size pool, the pool pump would have circulated the entire volume of the pool through the filter one time just during the cleaning cycle and, absent any heavy use or loading, the pump could be shut down until the start of the next daily cleaning cycle. Under these conditions, the system operated in accord with the present invention would produce an energy savings of 13.5 kWh per day and would consume 44% less energy. At a daytime rate of $0.16 per kWh, this would amount to a daily savings of $2.16 and an annual savings of about $790.

The environmental impact of this savings over a one year period amounts to a reduction of about 5 tons of carbon dioxide emissions (2 pounds of carbon dioxide per kWh). In addition, if the ozone generator 40 was in continuous operation during both the cleaning and turnover cycles of this example, it is estimated that normal consumption of chlorine would be reduced by two-thirds or more, with an associate savings in the cost of purchasing, delivering, storing and administering this highly oxidative compound. Even without any state, federal or utility sponsored subsidy, it is estimated that the incremental cost to install the additional elements necessary for this energy efficient system as part of a new pool would be recovered in 3 years or less.

In this example, further enhanced performance would be achieved if the popup heads 27 took the form of the recently released G4 or G4V heads manufactured by the A&A Division of Shasta Industries, Inc.

In this same example, assuming additional turnover was desired, the speed of the pool motor 24 could be reduced to 600 RPM at which speed it would circulate approximately 12 GPM or about 720 gallons per hour while requiring only 112 watts (FIGS. 15A and 15C). If the pool motor 24 was operated at this decreased speed for 19.5 hours (until the next cleaning cycle started) it would turnover an additional volume of approximately 14,000 gallons, or about two-thirds the volume of an average pool. A greater or lesser amount of turnover could be achieved with changes in motor speed or run time at the substantially reduced speed. In any case, throughout this extended turnover period, the circulating flow of water from the filter would be directed by the solenoid-actuated three-way valve 33 to the inlet 55 of the venturi skimmer 29 and would provide more than enough pressurized flow to maintain the skimmer in operation, continuously drawing any floating debris from the surface 30 and into the mesh basket 52 of the skimmer 29 (FIGS. 6B and 6C). During this extended (19.5 hour) turnover period, the pool motor 24 would consume a total of about 2.2 kWh, for a total energy consumption 12.7 kWh, when added to the 10.5 kWh consumed during the cleaning cycle (which included the turnover of some 20,000 gallons). With this extended turnover period, the FIG. 2 system embodying the key features of the present invention would turnover almost twice the volume of the pool while consuming a total of 12.7 kWh as compared to a prior art system using a prior art distribution valve and a single speed motor, which would consume approximately 24 kWh of energy. This daily savings of 11.3 kWh translates to a operating cost savings of $1.80 per day or $660 per year at a typical daytime utility rate of $0.16 per kWh.

3. Example

Simple Retrofit System

It is estimated that there may be on the order of 300,000 swimming pools with in-floor cleaning systems that could be retrofitted to take advantage of the energy savings provided through use of the present invention. In the simplest retrofit application, the rotating distribution valve 16 in a prior art system of the type shown in FIG. 1 would be either modified to embody the present invention or replaced with a new distribution valve that provides the benefits of the present invention.

As previously noted, a prior art system such as the one shown in FIG. 1 typically uses a 1.5 hp motor 9 that is operated eight hours per day at a single fixed speed of 3450 RPM and consumes energy at the level of about 3000 watts, depending on motor efficiency. By converting or replacing the distribution valve 16 to operate in accord with the present invention, the dwell time and dwell factor to which the popup heads are exposed will be significantly increased and the cleaning capacity of the system will be enhanced by a factor in the range between about 60 and 200%. If this increased cleaning capacity were allocated primarily to energy savings while maintaining or exceeding the original cleaning capacity of the prior art system (FIG. 16, boxes 16-5, 16-6), then the run time of the motor 9 could be reduced, by adjusting timer 10, to about 4 hours per day. This would produce an energy savings of approximately 12 kWh per day, without the additional cost of a variable speed motor.

In the case where an existing system is retrofitted without replacing the fixed speed (3450 rpm) pump motor, the system flow rate will remain high, at about 85 GPM and in the reduced run time of 4 hours, a total of 20,400 gallons of water will be circulate through the filter, an amount that equals the volume of an average pool. Thus, for most pools, the turnover time will approximately equal (or exceed) the cleaning time. It is expected that further enhanced cleaning and circulation performance would be achieved if the popup heads 17 in the prior art system of FIG. 1 were also replaced as a part of the retrofit process with the recently released G4 or G4V heads manufactured by the A&A Division of Shasta Industries, Inc.

The relatively simple modification required to retrofit an existing system to operate in accord with the present invention would result in an annual savings in energy cost of about $700 at the daytime rate of $0.16 per kWh and the homeowner would recover the conversion cost in about 2.5 years, or even less if there was any form of governmental, tax or utility rebate. At an annual energy savings of approximately 4.3 megawatt hours (MWh) per swimming pool conversion, a broad based program to retrofit a material portion of the estimated 300,000 candidate swimming pools could restore hundreds of megawatts in peak generation capacity nationwide, with a proportionate reduction in transmission/delivery load and loss.

The subject matter of the present invention is defined in the following claims.

The invention claimed is:

1. A method for improving the energy efficiency of a cleaning system of a swimming pool that includes
    (i) a water circulation pump driven by an electric motor, said pump having a pressurized outlet in fluid communication with a filter and a suction inlet in fluid communication with at least one drain in said pool;
    (ii) a multiport water distribution valve controlled by a rotating cam, said distribution valve having an inlet port in fluid communication via said filter with the outlet of the pump and having a plurality of outlet ports for sequentially distributing flow from the inlet port, wherein said cam includes:
        (a) a cam plate having a center of rotation connected to a drive shaft of said distribution valve;
        (b) a leading cam surface to control the opening of said plurality of outlet ports, said leading cam surface extending circumferentially from said cam plate at an included angle between about 46 and 52 degrees;
        (c) a trailing cam surface to control the closing of said plurality of outlet ports, said trailing cam surface extending circumferentially from said cam plate at an angle of between about 54 and 66 degrees; and
        (d) a transitioning cam surface extending between said leading and trailing cam surfaces to selectively maintain the outlet ports in their open position and to allocate and minimize concurrent flow through two adjacent outlet ports as one port closes and the adjacent port opens;
        (iii) plural sets of popup cleaning heads each of said heads having an inlet in fluid communication with one of the plurality of outlet ports from said distribution valve and further having a jet-forming aperture in fluid communication with an outlet from the head, said heads being mounted in the pool surface and, in response to a flow of water having a predetermined minimum pressure, extending from said surface and directing a jet of water along the adjacent surface of the pool for the purpose of moving debris and suspending particles for incorporation into the return flow to said circulation pump;
    the method including the steps of:
        controlling said motor to operate at a first speed to deliver a flow of water to said heads at a pressure that exceeds said predetermined minimum pressure by an amount required for normal operation of said popup heads; and
        minimizing the total operation time of said motor, over any 24-hour period, when the pressure delivered to said popup heads exceeds said pre-determined minimum pressure while maintaining movement of debris and suspension of particles from the surfaces of said pool adjacent to said popup heads.

2. The method of claim 1 including the additional step of supplementing the flow of water to said popup heads by incorporating at least one venturi in the flow between the outlet of said filter and the outlet of at least one of said popup heads, said venturi having a suction inlet in fluid communication with the water in said swimming pool.

3. The method of claim 2 including the additional step of controlling said pool pump motor to operate at a second speed, substantially lower than said first speed, to deliver a flow of water from said pump at a pressure below said predetermined minimum pressure and at a pressure above that level required for circulation of water through said filter.

4. The method of claim 3 including the additional step of providing said pool with at least one venturi skimmer having an inlet in fluid communication with the outlet of said pump.

5. The method of claim 4 including the additional step of allocating a first portion of the flow of water from the outlet of said pump to said venturi skimmer when the pump is running at or above said first speed and directing a second portion of said flow of water to the venturi skimmer when the pump is running at said second speed.

6. The method of claim 5 including the additional step of activating at least one ozone generator to inject ozone into the circulating flow of water during substantial portions of the time that the circulation pump motor is in operation.

7. The method of claim 2 wherein said venturi is incorporated into the flow between the jet-forming aperture of at least one of said popup heads and the outlet from said popup head.

8. The method of claim 1, including the additional step of controlling said motor to operate at a second speed, substantially lower than said first speed, to deliver a flow of water from said pump at a pressure below said predetermined minimum pressure and at a pressure above that level required for circulation of water through said filter.

9. The method of claim 8 including the additional step of providing said pool with at least one venturi skimmer having an inlet in fluid communication with the outlet of said pump.

10. The method of claim 9 including the additional step of allocating a first portion of the flow of water from the outlet of said pump to said venturi skimmer when the pump is running at or above said first speed and directing a second portion of said flow of water to the venturi skimmer when the pump is running at said second speed.

11. The method of claim 10 including the additional step of activating at least one ozone generator to inject ozone into the circulating flow of water during substantial portions of the time that the circulation pump motor is in operation.

12. An improved swimming pool circulation, filtration and cleaning system having:
   (i) a water circulation pump driven by an electric motor, said pump having a pressurized outlet in fluid communication with a filter and a suction inlet in fluid communication with at least one drain in said pool;
   (ii) a multiport water distribution valve controlled by a rotating cam, said distribution valve having an inlet port in fluid communication via said filter with the outlet of said pump and having a plurality of outlet ports for sequentially distributing flow from the inlet port, wherein said cam includes:
      (a) a cam plate having a center of rotation connected to a drive shaft of said distribution valve;
      (b) a leading cam surface to control the opening of said plurality of outlet ports, said leading cam surface extending circumferentially from said cam plate at an included angle between about 46 and 52 degrees;
      (c) a trailing cam surface to control the closing of said plurality of outlet ports, said trailing cam surface extending circumferentially from said cam plate at an angle of between about 54 and 66 degrees; and
      (d) a transitioning cam surface extending between said leading and trailing cam surfaces to selectively maintain the outlet ports in their open position and to allocate and minimize concurrent flow through two adjacent outlet ports as one port closes and the adjacent port opens;
   (iii) plural sets of popup cleaning heads each of said heads having an inlet in fluid communication with one of the plurality of outlet ports from said distribution valve and further having a jet-forming aperture in fluid communication with an outlet from the head, said heads being mounted in the pool surface and, in response to a flow of water, extending from said surface and directing a jet of water along the adjacent surface of the pool to move debris and suspend surface particles for incorporation into the return flow to said circulation pump,
   (iv) a timer for controlling the operation of said motor to generally minimizing the total time, over any 24-hour period, when the pressure delivered to said popup heads exceeds said pre-determined minimum pressure while maintaining cleaning movement of debris and suspension of particles from the surfaces of said pool adjacent to said popup heads.

13. The system of claim 12 further including at least one venturi in the flow between the outlet of said filter and the outlet of at least one of said popup heads, said venturi having a suction inlet in fluid communication with the water in said swimming pool.

14. The system of claim 13 including a timer for controlling said pool pump motor to operate at a first speed to deliver a flow of water to said heads at a pressure that exceeds said predetermined minimum pressure by an amount required for normal operation of said popup heads in said pool.

15. The system of claim 14 further including means for controlling said pool pump motor to operate at a second speed, substantially lower than said first speed, to deliver a flow of water from said pump at a pressure below said predetermined minimum pressure and at a pressure above that level required for circulation of water through said filter.

16. The system of claim 15 further including at least one venturi skimmer having an inlet in fluid communication with the outlet of said pump.

17. The system of claim 16 including means for allocating a first portion of the flow of water from the outlet of said pump to said venturi skimmer when the pump is running at or above said first speed and directing a second portion of said flow of water to the venturi skimmer when the pump is running at said second speed.

18. The system of claim 17 further including at least one ozone generator to inject ozone into the flow of water during substantial portions of the time that the circulation pump motor is in operation.

19. The system of claim 13 wherein said venturi is incorporated into the flow between the jet-forming aperture of at least one of said popup heads and the outlet from said head.

* * * * *